US008731603B2

(12) United States Patent
Khemakhem et al.

(10) Patent No.: US 8,731,603 B2
(45) Date of Patent: May 20, 2014

(54) RF CIRCUIT MODULE AND PANEL

(75) Inventors: M'hamed Anis Khemakhem, Eden Prairie, MN (US); Steven Mark Swam, Shakopee, MN (US); Jeffrey Louis Peters, Eagan, MN (US); Nasser Pooladian, Roseville, MN (US); James Stansbury, Farmington, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 719 days.

(21) Appl. No.: 12/652,992

(22) Filed: Jan. 6, 2010

(65) Prior Publication Data
US 2010/0210236 A1 Aug. 19, 2010

Related U.S. Application Data

(60) Provisional application No. 61/142,817, filed on Jan. 6, 2009.

(51) Int. Cl.
*H04H 60/09* (2008.01)
*H04M 1/00* (2006.01)

(52) U.S. Cl.
USPC ............... 455/550.1; 455/3.03; 455/552.1; 455/556.1

(58) Field of Classification Search
USPC ............... 455/90.1, 575.1, 550.1, 347
See application file for complete search history.

(56) References Cited

U.S. PATENT DOCUMENTS

| | | | | |
|---|---|---|---|---|
| 3,519,945 A | * | 7/1970 | Lawson et al. ............... | 330/2 |
| 4,236,250 A | * | 11/1980 | Huffman ...................... | 455/8 |
| 5,130,893 A | * | 7/1992 | Straate et al. ................ | 361/728 |
| 5,144,267 A | | 9/1992 | West, Jr. | |
| 5,243,647 A | * | 9/1993 | Parikh et al. ................. | 380/241 |
| 5,363,465 A | * | 11/1994 | Korkowski et al. ........... | 385/135 |
| 5,418,490 A | * | 5/1995 | Kaegebein .................. | 330/124 D |
| 5,495,283 A | * | 2/1996 | Cowe ........................... | 725/33 |
| 5,550,825 A | * | 8/1996 | McMullan et al. ........... | 370/486 |
| 5,559,549 A | * | 9/1996 | Hendricks et al. ............ | 725/50 |
| 5,675,300 A | * | 10/1997 | Romerein ..................... | 333/100 |

(Continued)

FOREIGN PATENT DOCUMENTS

JP 2005-57731 3/2005

OTHER PUBLICATIONS

Maxnet®—RF Signal Management, Active Product Overview, www.atxnetworks.com; Rev. Feb. 2006 (P0534); 2 Pages.

(Continued)

*Primary Examiner* — Tilahun B Gesesse
(74) *Attorney, Agent, or Firm* — Merchant & Gould P.C.

(57) ABSTRACT

A radio frequency signal distribution module and panel for receiving such a module are disclosed. One module includes a housing having a front and a rear, a radio frequency signal input connection positioned on the rear of the housing, and a plurality of radio frequency signal output connections positioned on the rear of the housing. The module also includes a splitter within the housing and connecting the radio frequency signal input connection to the plurality of radio frequency signal output connections. Certain modules include an active attenuation component connected to and providing programmable attenuation of a radio frequency signal output connection from among the plurality of radio frequency signal output connections. Other modules include a data port on the housing, the data port configured to communicate information about radio frequency signals within the module to a computing system remote from the module.

29 Claims, 20 Drawing Sheets

(56) References Cited

U.S. PATENT DOCUMENTS

| | | | |
|---|---|---|---|
| 5,903,829 A * | 5/1999 | Anderson et al. | 455/347 |
| 5,909,155 A * | 6/1999 | Anderson et al. | 333/100 |
| 5,955,930 A * | 9/1999 | Anderson et al. | 333/109 |
| 5,963,843 A * | 10/1999 | Sit et al. | 725/146 |
| 5,966,648 A | 10/1999 | Ortberg et al. | |
| 6,023,612 A * | 2/2000 | Harris et al. | 455/127.1 |
| 6,049,709 A * | 4/2000 | Anderson et al. | 455/347 |
| 6,055,418 A * | 4/2000 | Harris et al. | 455/91 |
| 6,289,210 B1 * | 9/2001 | Anderson et al. | 455/351 |
| 6,388,539 B1 * | 5/2002 | Rice | 333/25 |
| 6,449,768 B1 * | 9/2002 | Oftedahl et al. | 725/119 |
| 6,498,821 B2 | 12/2002 | Jonas et al. | 375/347 |
| 6,507,243 B2 * | 1/2003 | Harris et al. | 330/129 |
| 6,545,562 B2 | 4/2003 | Loeffelholz et al. | |
| 6,637,033 B1 | 10/2003 | Cloonan et al. | |
| 6,650,885 B2 * | 11/2003 | Anderson et al. | 455/349 |
| 6,668,480 B1 * | 12/2003 | Riley | 42/95 |
| 6,720,841 B2 | 4/2004 | Loeffelholz et al. | |
| 6,724,730 B1 * | 4/2004 | Mlinarsky et al. | 370/241 |
| 6,842,348 B2 | 1/2005 | Lee | |
| 6,856,786 B2 * | 2/2005 | Belostotsky et al. | 455/3.03 |
| D503,399 S | 3/2005 | Ogren | |
| 6,876,834 B2 * | 4/2005 | Wilson | 455/3.05 |
| 6,888,078 B2 | 5/2005 | Loeffelholz et al. | |
| 6,940,833 B2 * | 9/2005 | Jonas et al. | 370/329 |
| 6,941,119 B2 * | 9/2005 | Wilson et al. | 455/132 |
| 6,987,754 B2 * | 1/2006 | Shahar et al. | 370/349 |
| 7,027,776 B2 * | 4/2006 | Wilson et al. | 455/78 |
| 7,043,236 B2 | 5/2006 | Lee | |
| 7,058,967 B2 * | 6/2006 | Graber et al. | 725/108 |
| 7,075,893 B1 * | 7/2006 | Mlinarsky et al. | 370/241 |
| D526,645 S | 8/2006 | Ogren | |
| 7,123,650 B2 * | 10/2006 | Asia et al. | 375/222 |
| 7,135,649 B2 | 11/2006 | Loeffelholz et al. | |
| 7,142,414 B2 | 11/2006 | Lee et al. | |
| 7,149,188 B2 * | 12/2006 | Wilson | 370/235 |
| 7,197,294 B2 | 3/2007 | Anderson et al. | |
| 7,230,192 B2 | 6/2007 | Loeffelholz et al. | |
| D547,307 S | 7/2007 | Ogren | |
| 7,298,715 B2 * | 11/2007 | Hendler | 370/317 |
| 7,359,434 B2 * | 4/2008 | Shahar et al. | 375/222 |
| 7,647,044 B2 * | 1/2010 | Tamminen et al. | 455/424 |
| 7,830,455 B2 * | 11/2010 | Hsieh et al. | 348/678 |
| 8,151,457 B2 * | 4/2012 | Hammond et al. | 439/620.21 |
| 8,403,709 B2 * | 3/2013 | Hammond et al. | 439/676 |
| 2003/0168235 A1 | 9/2003 | Loeffelholz et al. | |
| 2004/0018826 A1 | 1/2004 | Anderson et al. | |
| 2006/0005981 A1 | 1/2006 | Loeffelholz et al. | |
| 2007/0195492 A1 | 8/2007 | Tamminen et al. | |
| 2008/0014898 A1 | 1/2008 | Anderson et al. | |
| 2008/0047807 A1 | 2/2008 | Loeffelholz et al. | |

OTHER PUBLICATIONS

Maxnet®—Amplifier or RF Detector/Switch (MNRS) Installation Instructions, www.atxnetworks.com; Rev. Sep. 2004 (P0544); 1 Page.

Maxnet®—RF Signal Management, Active Products—RF Switches, www.atxnetworks.com; Rev. Oct. 2006 (P0659); 2 Pages.

Maxnet®—RF & L-Band Signal Management, Active Products—Remote Powered Active Chassis, www.atxnetworks.com; Rev. Nov. 2005 (P0610); 1 Page.

Maxnet®—RF & L-Band Signal Management, Active Products—Power Supply; www.atxnetworks.com; Rev. Nov. 2005 (P0537); 1 Page.

Maxnet®—RF & L-Band Signal Management, Active Products—Standalone Redundant Powering Units; www.atxnetworks.com; Rev. Feb. 2006 (P0637); 3 Pages.

Maxnet®—RF Signal Management, Active Products—Amplifiers; www.atxnetworks.com; Rev. Nov. 2005 (P0660); 5 Pages.

Maxnet®—RF Signal Management, Passive Product Overview; www.atxnetworks.com; Rev. Dec. 2005 (P0542); 1 Page.

Maxnet®—RF Signal Management, Passive Products—RF Filters; www.atxnetworks.com; Rev. Dec. 2008 (ANW0729); 1 Page.

Maxnet®—RF & L-Band Signal Management, Connector & Terminator Options; www.atxnetworks.com; Rev. Feb. 2006 (P0667); 1 Page.

Maxnet®—Redundant RF Detector/Switch Module (MNRS) Operational Guide; www.atxnetworks.com; Rev. Sep. 2004 (P0543); 2 Pages.

Maxnet® II Platinum Series—RF & Optical Signal Management—Chassis & Cable Management Options; www.atxnetworks.com; Rev. Sep. 2006 (0614); 5 Pages.

Maxnet® II Platinum Series—RF & Optical Signal Management—Minicable Connectors/Tools, Terminators & Optical Attenuators—Connectors & Connector Installation Tools; www.atxnetworks.com; Rev. Jun. 2006 (P0636); 3 Pages.

Maxnet® II Platinum Series—RF & Optical Signal Management—Passive Modules—Standard Module Configurations; www.atxnetworks.com; Rev. Nov. 2005 (P0624); 1 Page.

Maxnet® II Platinum Series—RF & Optical Signal Management—Passive Products—Splitting/Combining Modules; www.atxnetworks.com; Rev. Feb. 2006 (P0621); 3 Pages.

Maxnet® II Platinum Series—RF & Optical Signal Management—Passive Products—Directional Coupler Modules; www.atxnetworks.com; Rev. Feb. 2006 (P0622); 2 Pages.

Maxnet® II Platinum Series—RF & Optical Signal Management—Passive Products—DC Logic A/B RF Switch; www.atxnetworks.com; Rev. Sep. 2006 (0701); 4 Pages.

Maxnet® II Platinum Series—RF & Optical Signal Management—Passive Products—MCX to F Transition Module; www.atxnetworks.com; Rev. Feb. 2006 (P0630); 1 Page.

Maxnet® II Platinum Series—RF & Optical Signal Management—Active Products—Return Path Optical Receivers; www.atxnetworks.com; Rev. Jun. 2006 (P0619); 6 Pages.

Maxnet® II Platinum Series—RF & Optical Signal Management—Active Products—Optical Transmitters; www.atxnetworks.com; Rev. Sep. 27, 2006 (P0620); 4 Pages.

Maxnet® II Platinum Series—RF & Optical Signal Management—Active Products—Power Supplies; www.atxnetworks.com; Rev. Sep. 2006 (P0615); 2 Pages.

Maxnet® II Platinum Series—RF & Optical Signal Management—Active Products—RF Detector A/B Switch; www.atxnetworks.com; Rev. Sep. 2006 (P0623); 4 Pages.

* cited by examiner

RF CIRCUIT MODULE AND PANEL

CROSS-REFERENCE TO RELATED APPLICATIONS

The present application claims priority to U.S. Provisional Patent Application No. 61/142,817, filed Jan. 6, 2009, the disclosure of which is hereby incorporated by reference in its entirety.

TECHNICAL FIELD

The present disclosure relates to radio frequency communication systems, such as broadband radio frequency networks. In particular, the present disclosure relates to a radio frequency circuit module and panel.

BACKGROUND

In telecommunications networks, broadband radio frequency (RF) signals are carried over coaxial conductors from a headend to consumers. At the headend, signals are received from a variety of sources, including antenna, satellite, fiberoptic, and other media sources. These signals, typically in the 5 MHz to 1 GHz range, are routed in a number of ways. For example, received RF signals can be combined, split, diverted, and added together to form a composite signal from a number of disparate sources (e.g. different networks or devices).

To accomplish the desired RF signal management, the headend will typically include RF distribution equipment including a number of modules for modifying signals. For example, in order to adequately tune the system, it may be desirable to provide attenuators or the like to attenuate a signal to a desired level. Further, as a broadband RF signal is carried over a length of cable, the high frequency range of the signal may be attenuated more than a low frequency range of the signal. As a result, equalizers are utilized to modify the signal to have a level intensity throughout its frequency range.

Frequently, tuning is accomplished through the use of plug-in devices (e.g. attenuators or equalizers). Exemplary systems including plug-in devices are disclosed in U.S. Pat. No. 6,289,210. Such plug-in devices are typically serviced in person by a technician, and manual adjustments are made to the RF distribution equipment (e.g. modules). These manual adjustments require the technician to monitor one or more ports of a module to determine various RF signal characteristics (e.g. amplitude, attenuation, signal degradation, etc.), and to replace the attenuator or equalizer as necessary. This is a time consuming process, and requires the technician to carry a large number of different, compatible plug-in modules for use in such a system.

For these and other reasons, improvements are desirable.

SUMMARY

In accordance with the following disclosure, the above and other problems are solved by the following:

In a first aspect, a radio frequency signal distribution module is disclosed. The module includes a housing having a front and a rear, a radio frequency signal input connection positioned on the rear of the housing, and a plurality of radio frequency signal output connections positioned on the rear of the housing. The module further includes a splitter within the housing and connecting the radio frequency signal input connection to the plurality of radio frequency signal output connections, and an active attenuation component connected to and providing programmable attenuation of a radio frequency signal output connection from among the plurality of radio frequency signal output connections.

In a second aspect, a radio frequency signal distribution panel is disclosed. The radio frequency distribution panel includes a housing comprising a top, bottom, left side, right side, front side, and rear side, a plurality of slots in the front side of the housing, each of the plurality of slots arranged to receive a radio frequency signal distribution module, and at least one radio frequency signal distribution module inserted into a slot from among the plurality of slots, the radio frequency signal distribution module including a data port configured to communicate attenuation information to a computing system remote from the module.

In a third aspect, a radio frequency signal distribution module is disclosed. The module includes a housing having a front and a rear, a radio frequency signal input connection positioned on the rear of the housing, and a plurality of radio frequency signal output connections positioned on the rear of the housing. The module also includes a splitter within the housing and connecting the radio frequency signal input connection to the plurality of radio frequency signal output connections, and an active component connected to and providing programmable signal conditioning of a radio frequency signal output connection from among the plurality of radio frequency signal output connections. The module further includes a data port on the housing, the data port configured to communicate information about radio frequency signals within the module to a computing system remote from the module.

In a further aspect, a method of managing distribution of radio frequency signals is disclosed. The method includes mounting a radio frequency distribution module in a radio frequency signal distribution panel, the radio frequency distribution module including a radio frequency input connection, a plurality of radio frequency output connections, and at least one active radio frequency component. The method further includes connecting a computing system to a data connection of the radio frequency distribution module, and monitoring a signal using the computing system.

DETAILED DESCRIPTION

Figure 1:
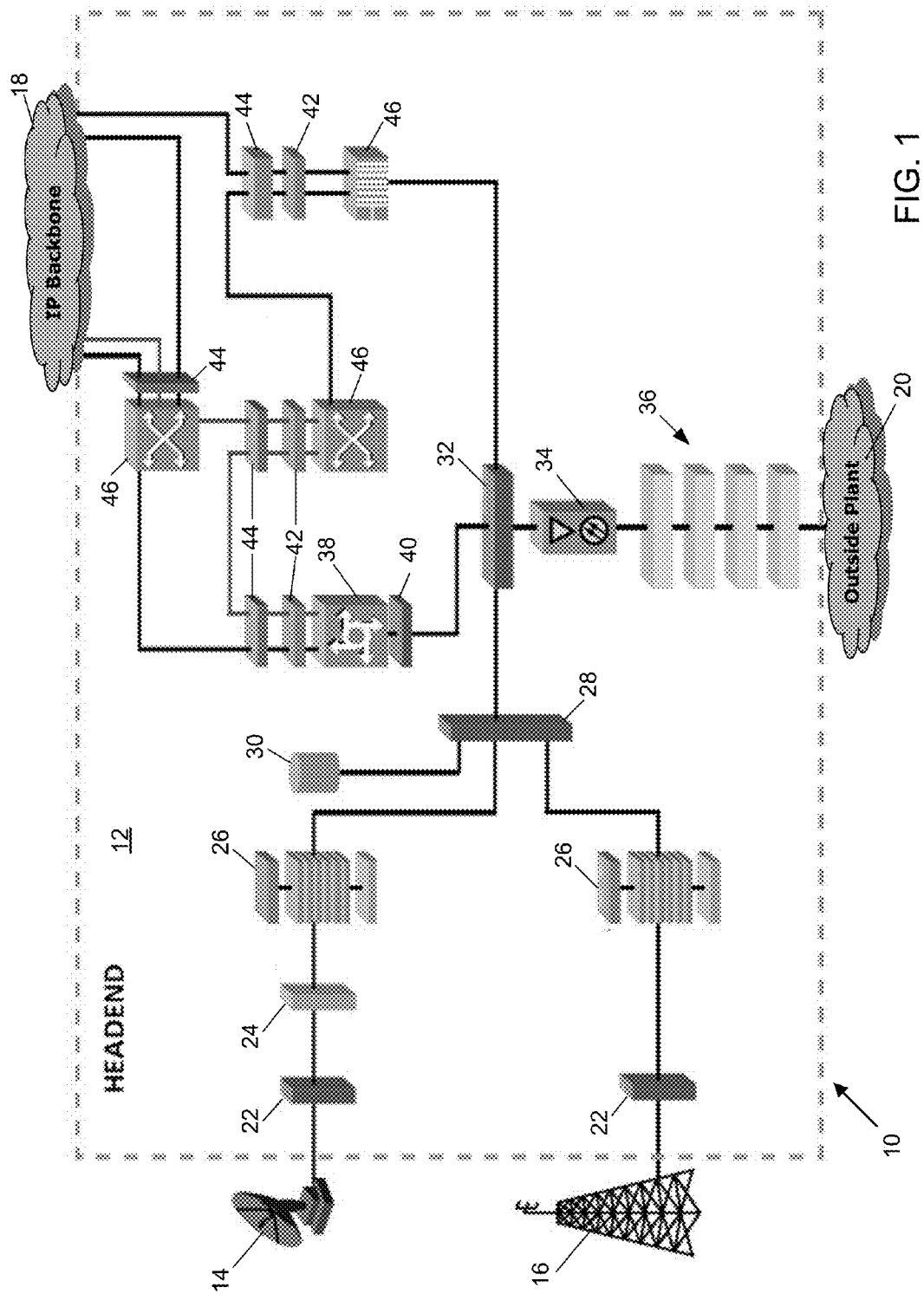
FIG. 1 illustrates a schematic diagram of a portion of an RF signal distribution network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to a radio frequency distribution module and a panel capable of receiving such modules. In the various aspects of the present disclosure, the radio frequency distribution modules can include active attenuation modules or other active, electronically controlled components. By "active", it is intended that traditionally passive (non-powered) RF signal conditioning components can be replaced by a powered component, thereby allowing electronic monitoring and adjustability of that powered component without requiring replacement of the physical component or module.

In other aspects of the present disclosure, the radio frequency distribution modules can include ports for local and remote monitoring and control of RF signal attenuation, amplification, or equalization. Such systems can be incorporated into headend signal distribution systems, and save a substantial amount of effort and overhead related to manual maintenance of RF signal distribution systems by a technician.

Referring now to FIG. 1, a schematic diagram of a portion of an RF signal distribution network 10 is shown, in which aspects of the present disclosure can be implemented. The RF signal distribution network 10 includes a headend 12, which generally connects between RF signal receiving equipment and external data networks. In the embodiment shown, the headend connects between RF signal receiving equipment including a satellite 14 and an antenna 16. Other RF signal receiving equipment can be included as well. The external data networks, as illustrated, include an IP network 18 and an outside-plant network 20, which is shown to be a fiberoptic network but could also be any other type of IP or other data network as desired. Other networks can be configured to receive data via a data network as well.

The headend 12 includes a number of RF signal configuration and routing systems for combining received RF signals and generating a composite RF signal for distribution to businesses and households via the external data networks. In the embodiment shown, signals received from the satellite 14 and antenna 16 are passed through splitters 22, optional patch panels 24, and to a panel of signal conditioning equipment 26, which can include, for example, RF receivers, signal processing, and modulators. From the signal conditioning equipment 26, the received signals can be combined at a further splitter/combiner 28, which combines received signals with optional additional signals sources, such as a video-on-demand source 30.

From the splitter/combiner 28, a combined RF signal is passed to further signal conditioning equipment, such as splitter 32, which can route signals to other equipment for conditioning in advance of distribution on external data networks. In the embodiment shown, a fiberoptic transport 34 converts a received RF signal into a fiberoptic signal, and distributes that signal through a number of fiberoptic signal routing modules 36 (e.g. fiberoptic frames, guides, and/or cabinets) to an external fiber network (e.g. the outside-plant network 20). Additionally, a cable modem termination system (CMTS) 38 receives the RF signal via a further signal distribution module 40, and through power distribution modules 42 and data network modules 44 to gateways 46 (e.g. multimedia and IP gateways) for distribution on the IP network 18 as multimedia, voice-over-IP, or other data services.

In the RF signal distribution network 10, various modular systems can be used as splitters, combiners, amplifiers, or equalizers to accomplish RF signal distribution. Further details regarding example attenuation modules, and systems incorporating such modules, are described in U.S. Pat. Nos. 6,049,709; 6,289,210; 6,650,885; 7,197,294; as well as in U.S. Pat. Nos. 6,545,562; 6,720,841; 6,888,078; 7,135,649; and 7,230,192 and U.S. Patent Publications Nos. 2003/0168235, 2006/0005981, and 2008/0047807, the disclosures of all of which are hereby incorporated by reference in their entireties. Further details regarding example amplifier modules, and systems incorporating such modules, can be found in U.S. Pat. No. 5,966,648, the disclosure of which is also hereby incorporated by reference in its entirety. Details regarding example switching modules, and systems incorporating such modules, can be found in U.S. Patent Pub. No. 2007/0195492 and U.S. Pat. No. 5,963,843, the disclosures of which are also incorporated by reference in its entirety.

Figure 2:
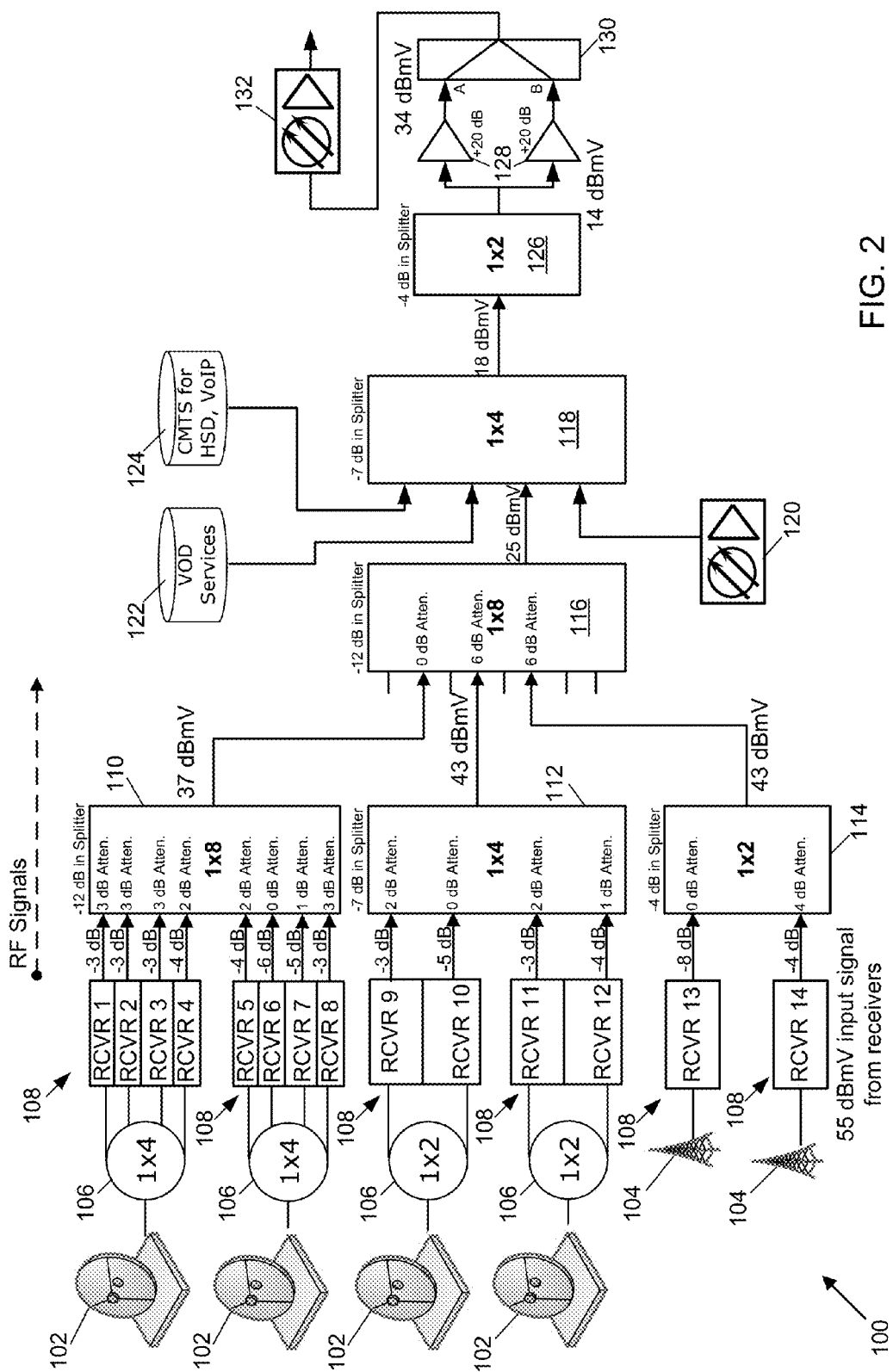
FIG. 2 provides a schematic view of a headend illustrating example attenuation levels.

FIG. 2 provides a schematic view of an example headend 100 illustrating attenuation levels for RF signals passing through the various RF signal distribution components in a headend, such as the headend 12 of FIG. 1. In the headend 100, a number of sources receive signals for distribution onto data networks, including satellites 102 and antennas 104. The satellites 102 and antennas 104 route the received signals through L-Band splitters 106, which, in the embodiment shown, includes 1×2 and 1×4 splitters. From the splitters 106, the signals are routed to receivers 108, which isolate various data channels and output an RF signal of known peak amplitude (in the embodiment shown, illustrated as approximately 55 dBmV. From the receivers 108, the RF signals are passed along coaxial cables of varying lengths to splitter/combiner modules. In the embodiment shown, the splitter/combiner modules include a 1×8 splitter/combiner 110, a 1×4 splitter/combiner 112, and a 1×2 splitter/combiner 114.

The RF signals received at the splitter/combiners are attenuated due at least in part to the distance of signal travel from the receivers 108. Therefore, each channel output from a receiver may have different attenuation (as illustrated from the output from receivers 1-14, having attenuation from approximately −3 dB to approximately −8 dB). Therefore, optimally, the splitter/combiners 110, 112, 114 attenuate the highest-amplitude signals to result in matched input signal strengths for each splitter/combiner. Matching input signal strength prevents component failure in the headend which may be caused due to overload of a component. In the embodiment shown, the received input signal strength at splitter/combiner 110 is approximately 49 dB, the received input signal strength at splitter/combiner 112 is approximately 48 dB, and the received input signal strength at splitter/combiner 114 is approximately 47 dB.

Each of the splitter/combiner modules attenuates the received RF signal further, as explained below in conjunction with FIG. 3. In the embodiment shown, splitter/combiner 110 causes approximately a −12 dB attenuation to about 37 dBmV, splitter/combiner 112 causes approximately a −7 dB attenuation to about 43 dBmV, and splitter/combiner 114 causes approximately a −4 dB attenuation to about 43 dBmV. These signals are passed to a further 1×8 splitter/combiner 116, which performs an analogous function and combines the signals to form a combined output RF signal having an amplitude of 25 dBmV.

The output of the splitter/combiner 116 is routed to a 1×4 splitter/combiner 118, which merges the 25 dB signal from the splitter/combiner 116 with signals from other sources, including a fiberoptic network 120, video on demand services 122, and CMTS sources 124 for VoIP and HSD, as referenced in FIG. 1. The splitter/combiner 118 can, as necessary, attenuate signals from one or more sources and combine those signals into a composite output signal. In the embodiment shown, it is assumed that the 25 dBmV signal is the weakest signal received at the splitter/combiner, thereby resulting in a 18 dBmV output RF signal from the splitter/combiner 118 due to a −7 dB attenuation therein.

The 18 dBmV signal is passed to a 1×2 splitter/combiner 126, which splits the signal into two 14 dBmV signals (due to −4 dB attenuation in the splitter), and passes those signals to 20 dB amplifiers 128. The amplified signal (now 34 dBmV) is passed to a switch 130 used for failover between two channels, and out to a data network, shown as fiberoptic network 132.

As can be seen in the example headend 100 of FIG. 2, it becomes necessary to attenuate, amplify, and switch signals within equipment so that signals received from various sources can be matched and combined for output on a data network. Due to the large number of components necessary to implement a headend in practice, matching and maintaining proper attenuation and amplification levels can be a tedious and time-consuming process for a technician who is required to manually check each signal of each module to maintain proper signal strengths for each of the RF signals managed at the headend. Through use of the active, remotely-manageable modules described herein, a substantial amount of that effort can be saved.

Figure 3:
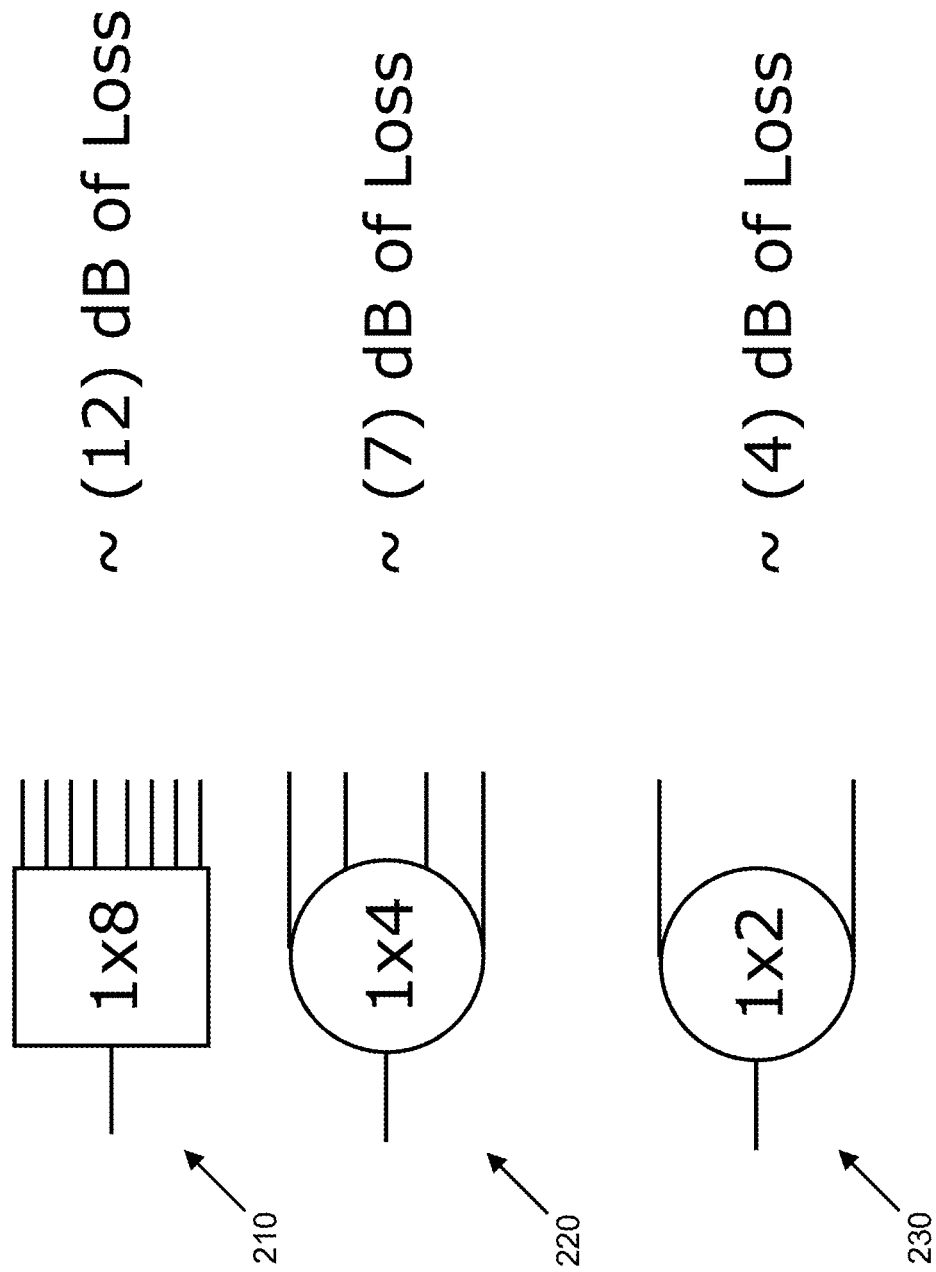
FIG. 3 illustrates example schematic RF splitter attenuation levels.

FIG. 3 illustrates example schematic RF splitter attenuation levels for three different splitters, 210, 220, 230. Each splitter includes an input signal and a number of output signals, such that each of the output RF signals carries all of the data received via the input RF signal. In the embodiment shown, splitter 210 is a 1×8 splitter, which typically experiences about a 12 dB attenuation of a received input signal for its output signals. Splitter 220 is a 1×4 splitter, which typically experiences about a 7 dB attenuation of the received input signal at its outputs. Finally, splitter 230 is a 1×2 splitter, which typically experiences about a 4 dB attenuation of the received input signal at its output. Although the example attenuation levels are described herein as having an approximate level it is understood that each output signal may have a different attenuation level within a given splitter or across splitters. Furthermore, other splitters, combiners, equalizers, or amplifiers may be used in an RF signal distribution module, each of which would have a different effect on the RF signal passing through the module. Additionally, different lengths between RF signal conditioning equipment can affect attenuation of the RF signals. Therefore, in the system as illustrated in FIG. 2, outputs from various headend RF signal distribution modules will have different attenuation levels, and therefore will require different RF attenuation or amplification in a module to normalize the RF signal for distribution to data networks.

Figure 4:
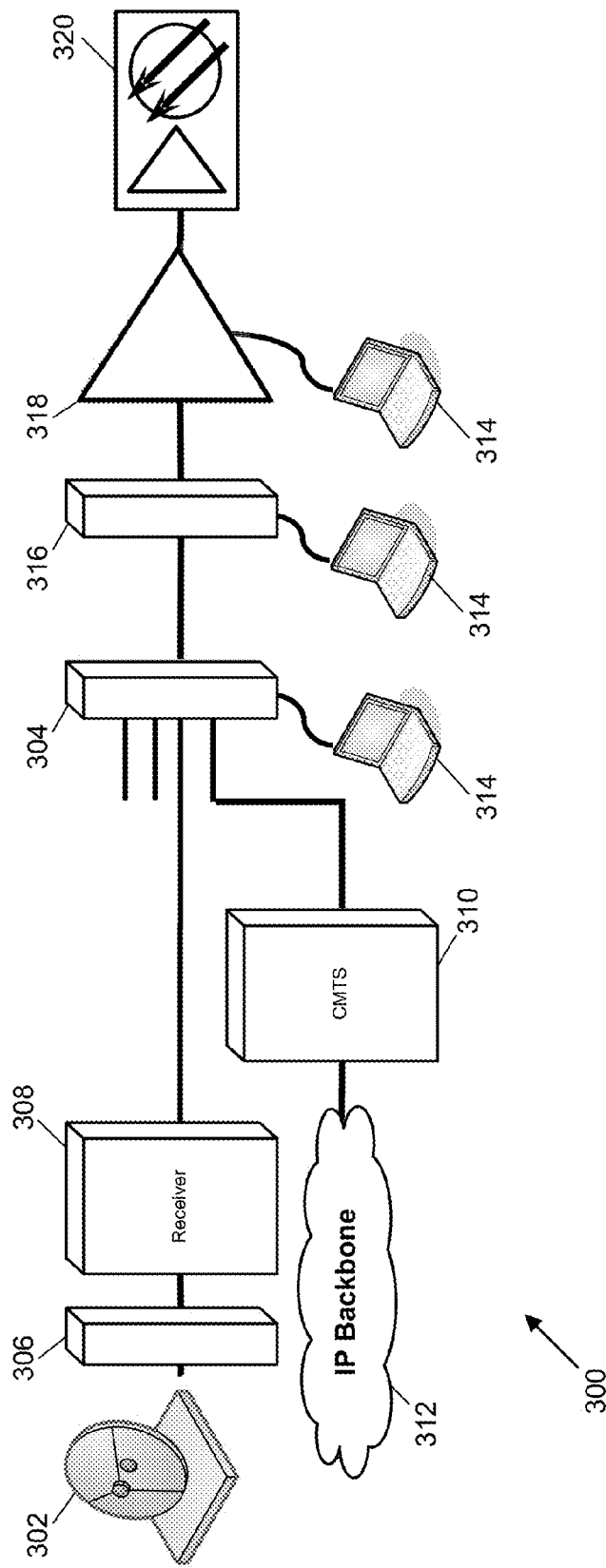
FIG. 4 illustrates a schematic of a portion of a headend implementing remote signal monitoring and adjustment by implementing aspects of the present disclosure.

FIG. 4 illustrates a schematic of a portion of a headend 300 implementing remote signal monitoring and adjustment by implementing aspects of the present disclosure. The portion 300 illustrates a generalized section of a headend representing a source-to-network path for an RF signal in which RF signal management may be used. In the embodiment shown, an RF signal received via a satellite 302 is transmitted to a splitter/combiner 304 by passing the signal through a signal conditioning block 306 and a receiver 308. A second RF signal is illustrated as generated by a CMTS system 310 based on data received from an IP network 312.

The splitter/combiner 304 has a data connection to a remote computing system 314, which can, in various embodiments, electronically control the attenuation of each of the output signals, and/or monitor the input signal level in that module. Likewise, additional RF signal distribution modules 316 and 318 (including an amplifier in the embodiment shown) include data connections to remote computing systems 316, 318, respectively, which provide electronic adjustability and/or monitoring capabilities remote from those modules as well. In the context of the present application, remote refers to a capability of transmitting the data to a location separate from the module, such as a different location from the location at which the module is housed An output end of the headend portion 300 is illustrated as a fiberoptic conversion module 320, for distribution of the received data as described above in FIG. 1. Other data output systems (e.g. IP-based network systems or other types of data communications networks) may be implemented as well.

By implementing a headend using the modules allowing remote monitoring and adjustment as shown in the portion 300, it is possible to reduce the need for manual adjustment of RF signal attenuation levels in the manner described in FIG. 2. For example, a technician can monitor signal attenuation in the splitter/combiner 304 and other signal distribution modules 316, 318. Optionally, the technician can also adjust attenuation, amplification, or other RF signal conditioning effects through use of active components within those modules, such as through use of the modules and panels described below in FIGS. 5-25.

Figure 5:
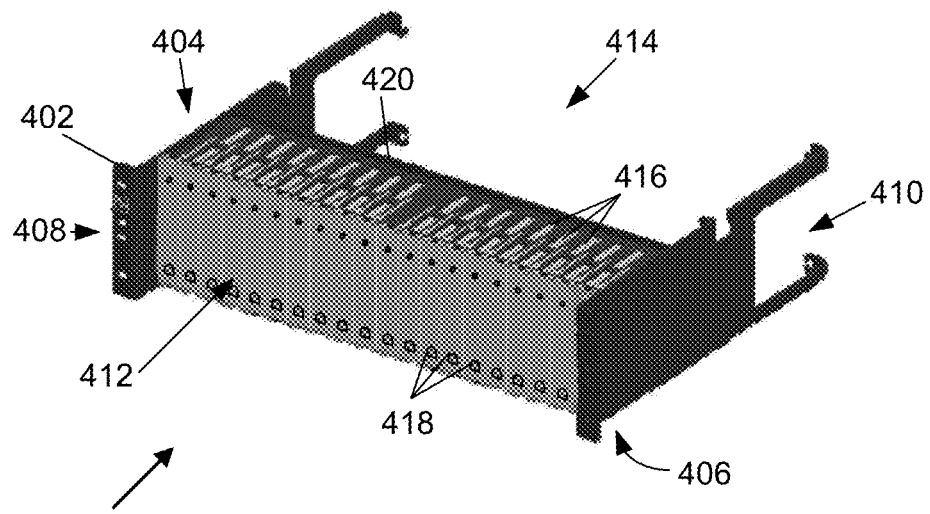
FIG. 5 is a front perspective view of a radio frequency management panel, according to a possible embodiment of the present disclosure.
Figure 6:
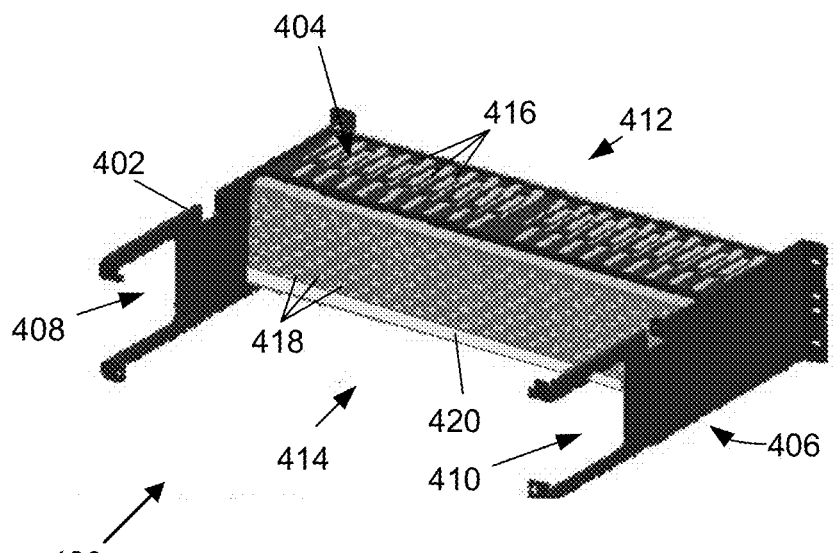
FIG. 6 is a rear perspective view of the radio frequency management panel of FIG. 5.

Referring now to FIGS. 5-6, a radio frequency management panel 400 is disclosed according to a possible embodiment of the present disclosure. The radio frequency management panel 400 is configured to be rack-mounted, and is formed from a housing 402 having a top 404, bottom 406, left side 408, right side 410, front side 412, and rear side 414. In various embodiments, the housing 402 can be a variety of sizes; in particular embodiments, the housing can be a standard rack-mount housing sized to reside in either about 2.5 or 3 rack units (in height). Example radio frequency management panels having similar construction to the one shown are disclosed in U.S. Pat. No. 7,197,294, the disclosure of which is hereby incorporated by reference in its entirety.

The radio frequency management panel 400 includes slots 416 in the front side 412 of the housing 402, each of which can receive a radio frequency signal distribution module, such as those shown in FIGS. 7-22, below. Each slot 416 can be, in certain embodiments, keyed to receive and secure a module in a friction-fit, latched, or other toolless arrangement. Details regarding one such arrangement are described in U.S. Pat. No. 7,197,294, the disclosure of which is incorporated by reference in its entirety. Additional details can also be found in U.S. Design patents Nos. D503,399; D526,645; and D547,307, the disclosures of which are also incorporated by reference in their entireties.

In the embodiment shown, the radio frequency management panel 400 is fully populated, in that each slot contains a radio frequency signal distribution module 418. The radio frequency distribution modules 418 can be any of a number of types of RF modules, such as those described below in conjunction with FIGS. 7-22. For example, one such radio frequency distribution module can include a data port configured to communicate attenuation information or signal level information to a computing system remote from the module, as described in further detail below. However, regardless of the types of modules used, it is understood that the panel 400 can be used in a configuration in which some slots remain unpopulated. In certain embodiments of the panel 400, up to 24 radio frequency distribution modules 418 can be inserted into the panel; however, alternative embodiments can include more or fewer distribution modules.

In certain embodiments, the panel 400 includes a backplane 420 configured to route power and signal monitoring connections to each slot for connection to each module inserted into the housing 402. The backplane 420 thereby allows both powering of active components (e.g. active attenuators, amplifiers, or equalizers) within the modules 418, and allows for connection to a remote computing system or interconnection of the modules, such that a single module within the panel 400 can be monitored and controlled from either another module in the panel, or from a remote computing system communicatively connected to the backplane 420 (e.g. as shown in the schematic of FIG. 4). For example, a single module can be configured to monitor and control settings for modules in one or more radio frequency management panels such as the one shown.

In the arrangements of panels including remote control of module settings (e.g. active attenuators, amplifiers, equalizers, or switches), each module or panel can be assigned an identification code to allow a remote system or remote communication/monitoring module to directly address that panel or module. In certain embodiments, assignment of identification codes can be automatic, using the methods and systems described in U.S. Pat. No. 7,237,041, the disclosure of which is hereby incorporated by reference in its entirety.

Figure 7:
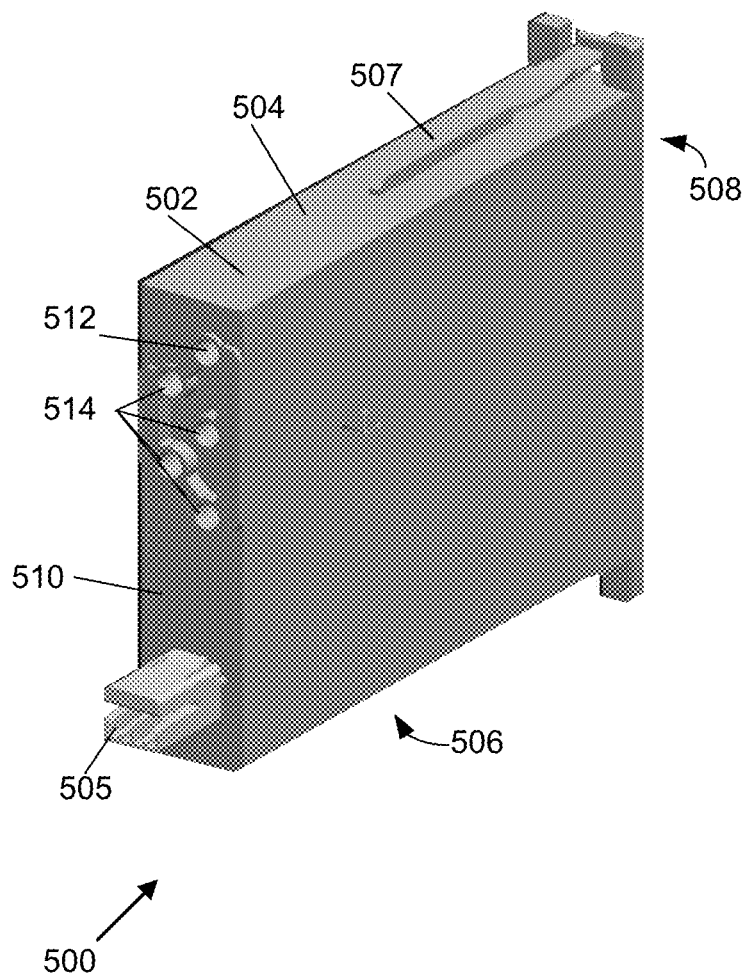
FIG. 7 is a rear perspective view of a radio frequency distribution module, according to a possible embodiment of the present disclosure.
Figure 8:
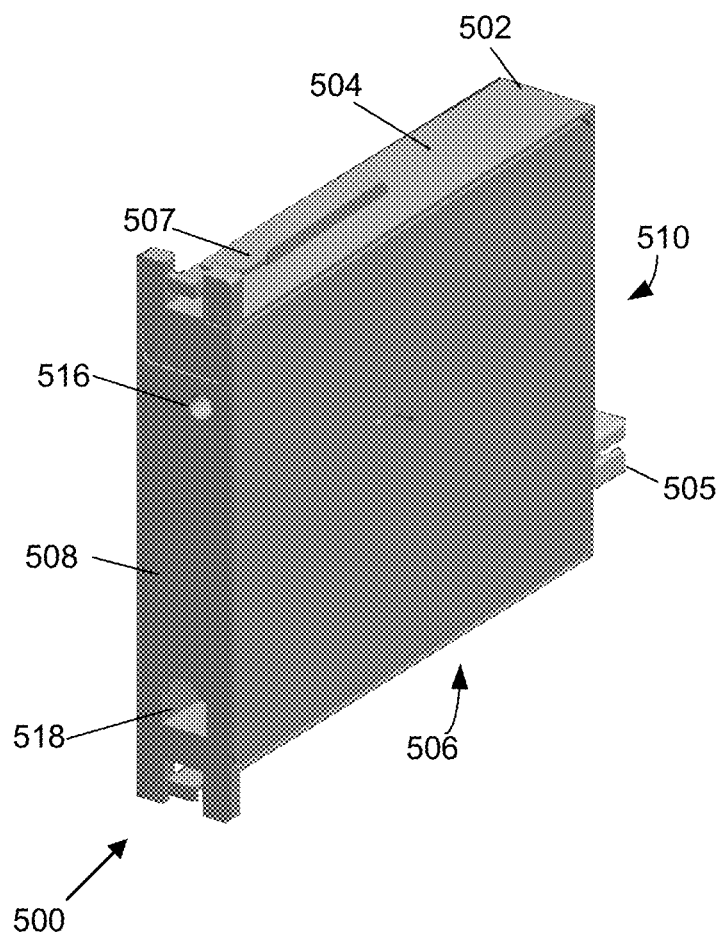
FIG. 8 is a front perspective view of the radio frequency distribution module of FIG. 7.

Referring now to FIGS. 7-8, a radio frequency distribution module 500 is shown, according to a possible embodiment of the present disclosure. The radio frequency distribution module 500, in the embodiment shown, illustrates the basic functionality of a splitter/combiner module as can be used in headend equipment such as a radio frequency management panel. The radio frequency distribution module 500 includes a housing 502 having a top 504 and bottom 506, front 508, and rear 510 sides. The housing 502 is sized to fit within a slot in a 2.5 rack unit sized panel, as described above with respect to the panel of FIGS. 5-6.

The housing 502 includes a power connection 505 on the rear 510, which can be inserted into a backplane of a radio frequency management panel for distribution of power to the modules and optional data communication to modules or computing systems external to the module 500. The housing 502 further includes alignment rails 507 on the top 504 and bottom 506 of the module, to guide the module into a slot in a radio frequency management panel. In the embodiment shown, the alignment rails include tabs extending toward the front 508, and arranged to allow the module to snap-fit into a panel.

In an alternative arrangement to the snap-fit connection using alignment rails shown, the module 500 can include a manual screw fastener arrangement, as is shown in U.S. Pat. Nos. 6,049,709; 6,289,210; 6,650,885; 7,197,294; as well as in U.S. Pat. Nos. 6,545,562; 6,720,841; 6,888,078; 7,135,649; and 7,230,192 and U.S. Patent Publications Nos. 2003/0168235, 2006/0005981, and 2008/0047807. Other arrangements are possible as well.

The radio frequency distribution module 500 includes an input connection 512 and a number of output connections 514 on the rear 510, which are connected at a splitter (seen, for example, in FIGS. 17-22, below) within the housing 502. In the embodiment shown, the radio frequency distribution module 500 includes four output connections 514; however, a different number of output connections could be incorporated instead, for example in the case of use of analogous functionality within the module 550 of FIGS. 9-10 (i.e. the 3 rack unit sized module).

In the embodiment shown (as well as in the various embodiments described below), the input connection 512 and the output connections 514 are MCX-type low profile coaxial RF connectors. Alternative connector styles, including standard, miniature, or other types of connectors could be used as well, such as F-type, BNC-type, LCC-type, LCP-type, 1.0/2.3-type, SMB-type, SMA-type or other types of RF connectors. One example LCC-type connector is disclosed in U.S. Pat. No. 5,467,062, the disclosure of which is hereby incorporated by reference in its entirety.

In further embodiments of the radio frequency distribution module 500, the radio frequency distribution modules can include an RF-to-fiberoptic media converter on one or more of the input connection 512 and output connections 514. In such embodiments, although the internal circuitry of the module would process radio frequency signals, the connectors at one or more of the input or output connections could be an LC-type, SC-type, or other fiberoptic connector type.

The radio frequency distribution module 500 also includes a monitor port 516 on the front 508 of the module 500, which is electrically connected to the input connection 512 within the housing 502. The monitor port 516 provides a location at which a technician can connect a scope or other instrument to monitor the status of the input signal. A data port 518 on the front 508 also allows for data communication to monitor the status of signals or active components (e.g. active attenuation or amplification components) within the module.

Figure 9:
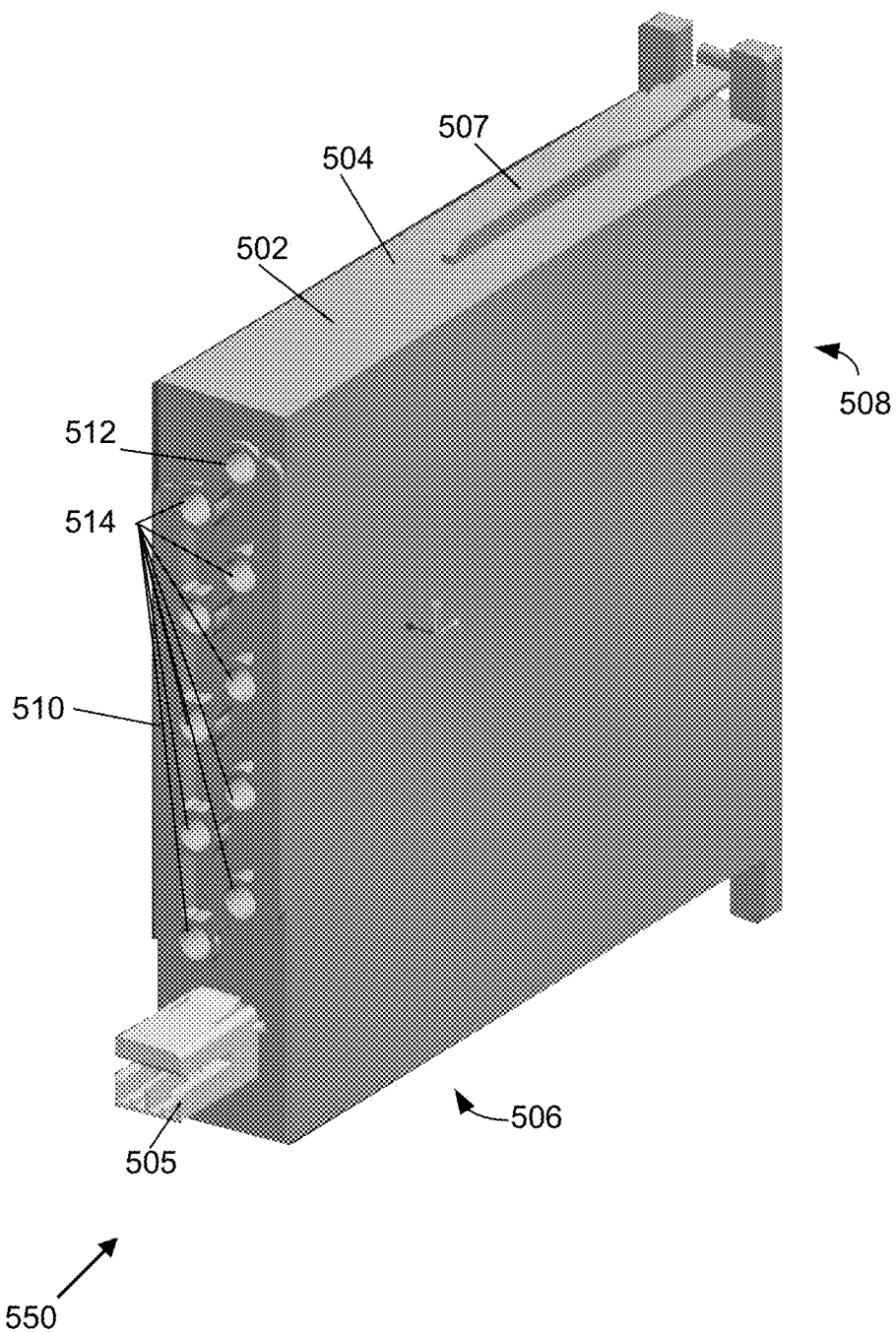
FIG. 9 is a rear perspective view of a radio frequency distribution module, according to a possible embodiment of the present disclosure.
Figure 10:
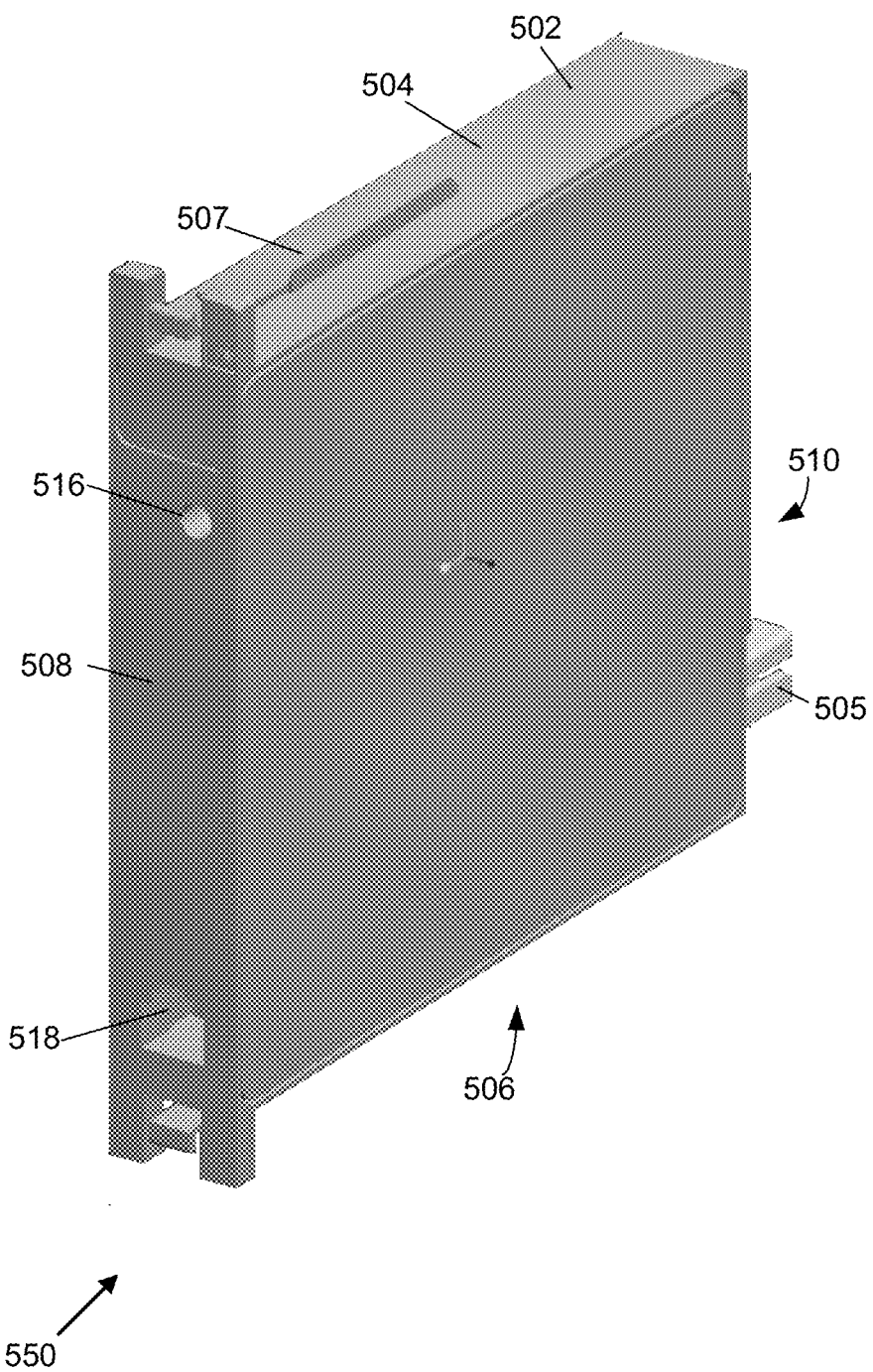
FIG. 10 is a front perspective view of the radio frequency distribution module of FIG. 9.

Referring now to FIGS. 9-10, a further radio frequency distribution module 550 is shown, according to a further possible embodiment of the present disclosure. The module 550 generally corresponds to and includes like elements to the module 500 of FIGS. 7-8, but, in the embodiment shown, the housing 502 is sized to fit within a slot of a 3 rack unit sized panel, as described above with respect to the panel FIGS. 5-6. In this embodiment, a larger number of output connections 514 can be located on the rear 510 of the housing. In the embodiment shown, a total of ten connections are located on the rear of the module; however, based on connector density, more or fewer connections could be included on the module 550.

Now referring to FIGS. 11-22, various embodiments of radio frequency distribution modules are described in which different functionality is provided. The various embodiments of FIGS. 11-22 provide permutations of the radio frequency distribution modules of FIGS. 7-10. While the modules 500, 550 of FIGS. 7-10 illustrate the connections of the embodiment of FIGS. 17-19, the various other embodiments of the modules of FIGS. 11-22 generally include different connections than those shown while providing analogous functionality, as described below.

Figure 11:
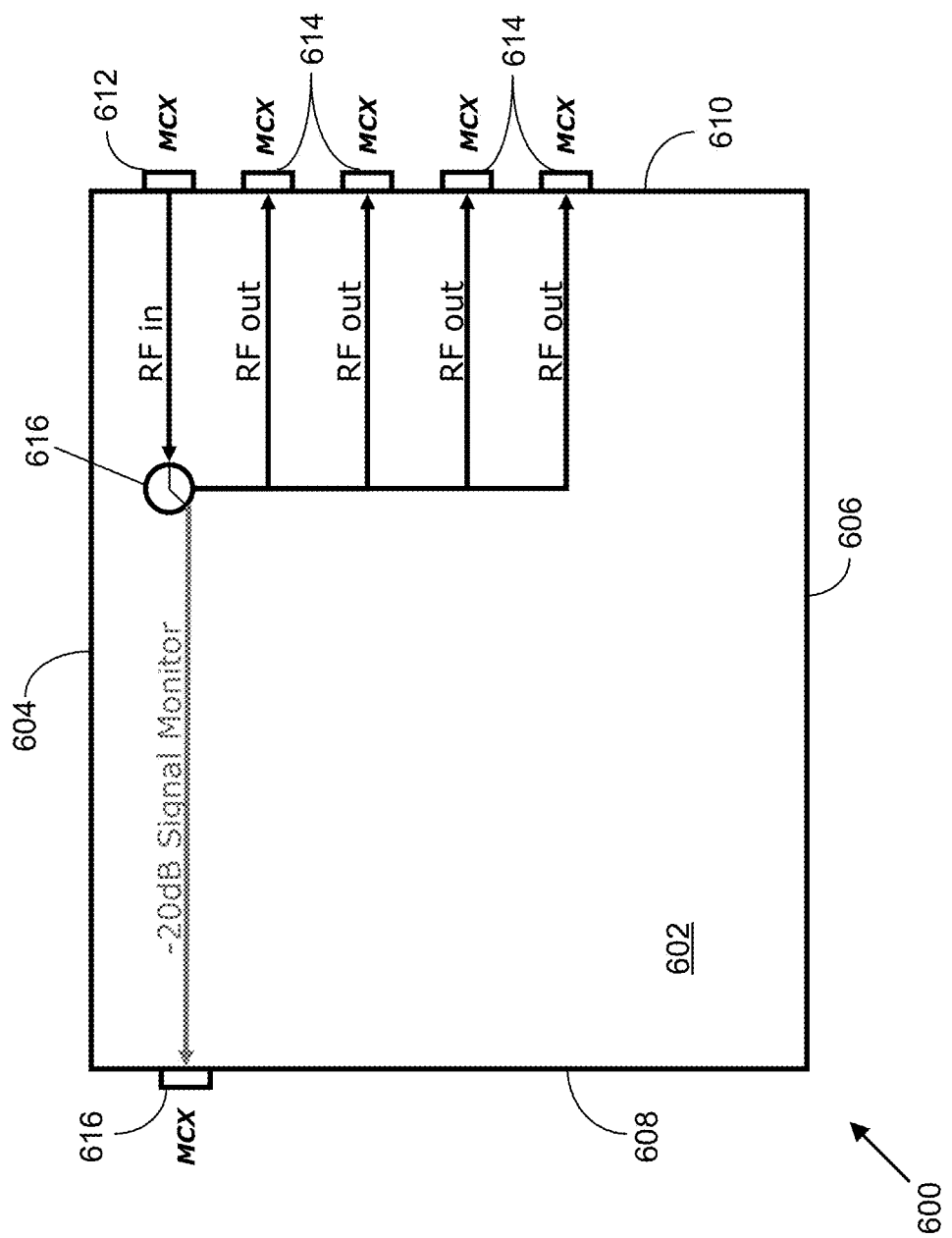
FIG. 11 is a schematic side view of a radio frequency distribution module.
Figure 12:
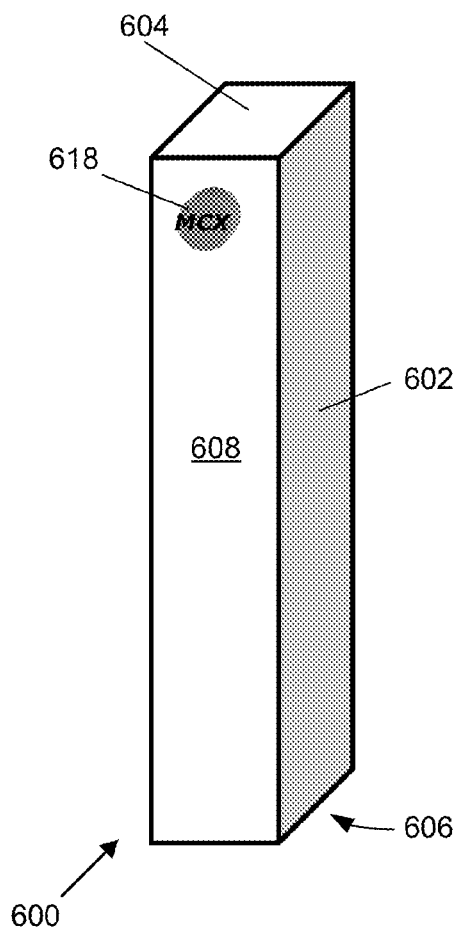
FIG. 12 is a schematic front perspective view of the radio frequency distribution module of FIG. 11.
Figure 13:
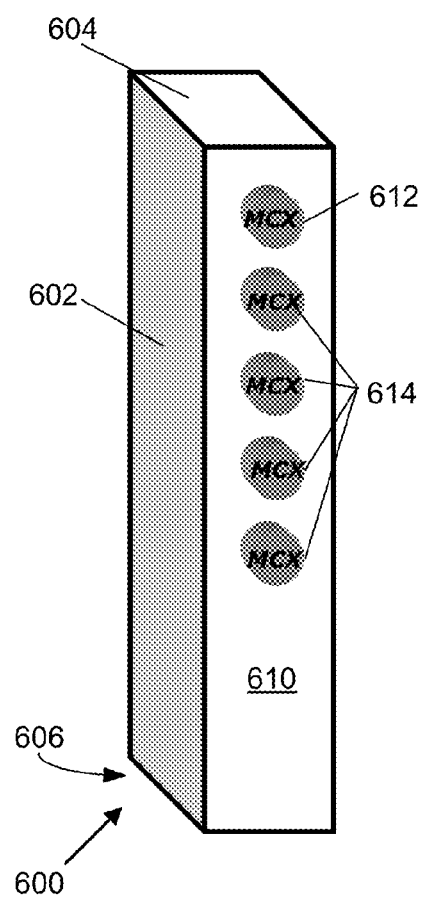
FIG. 13 is a schematic rear perspective view of the radio frequency distribution module of FIG. 11.

Referring now to FIGS. 11-13, a schematic representation of a basic radio frequency distribution module 600 is shown. The radio frequency distribution module 600, in the embodiment shown, illustrates the basic functionality of a splitter/combiner module as can be used in headend equipment such as a radio frequency management panel. The radio frequency distribution module 600 includes a housing 602 having a top 604 and bottom 606, front 608, and rear 610 sides, analogous to modules 500 and 550. The radio frequency distribution module 600 includes an input connection 612 and a number of output connections 614 on the rear 610, which are connected at a splitter 616 within the housing 602. In the embodiment shown, the radio frequency distribution module 600 includes four output connections 614; however, a different number of output connections could be incorporated instead, for example in the case a 2.5 or 3 rack unit housing size is selected.

The radio frequency distribution module 600 also includes a monitor port 618 on the front 608 of the module 600, which is electrically connected to the input connection 612 within the housing 602.

In the embodiment shown, the radio frequency distribution module 600 provides splitter and combiner functionality, but does not allow management of attenuation of signals passing from the input to the output connections. The frequency distribution module 600 is therefore intended as providing example operation of a single splitter/combiner module, upon which the various following embodiments of radio frequency distribution modules of FIGS. 14-22 provide additional features/functionality.

Figure 14:
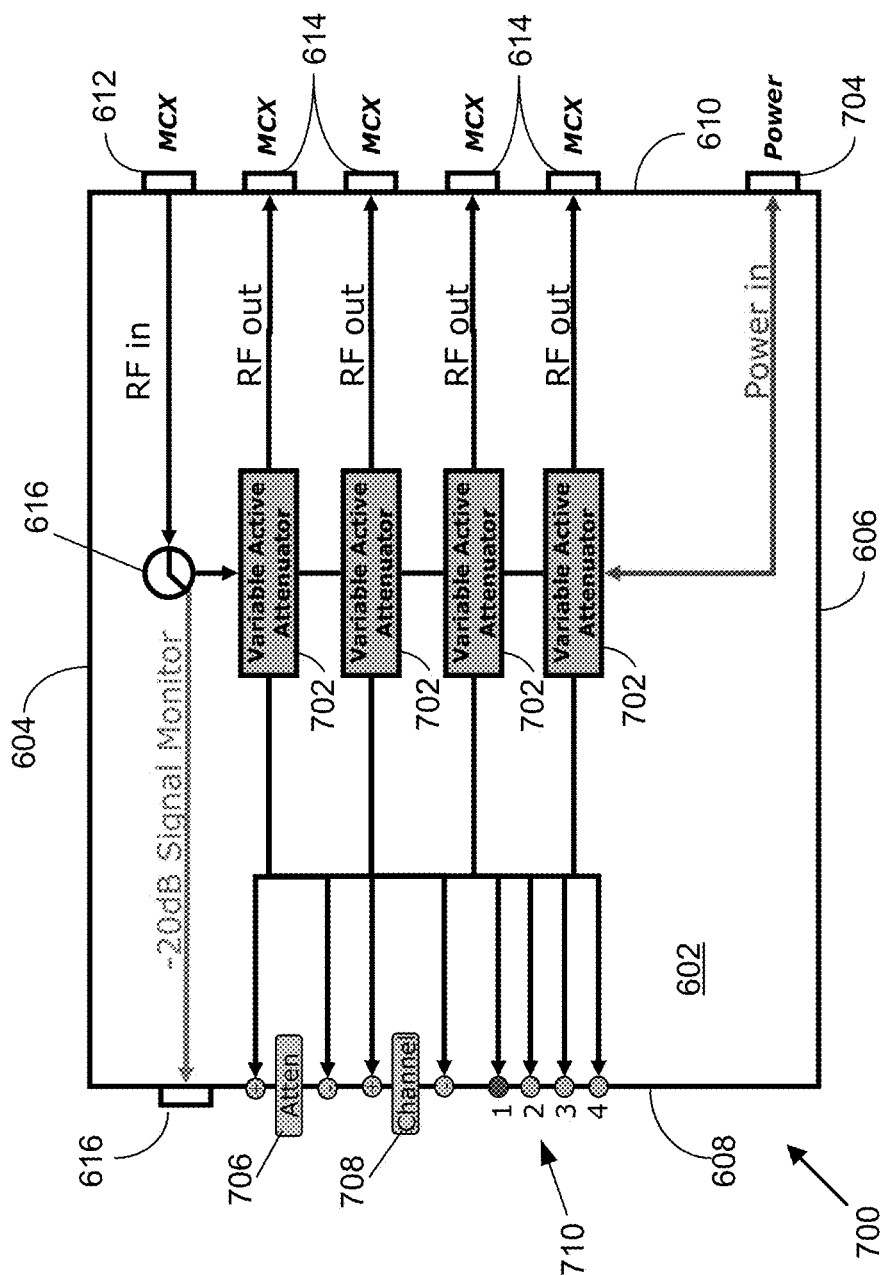
FIG. 14 is a schematic side view of a radio frequency distribution module, according to a further possible embodiment.
Figure 15:
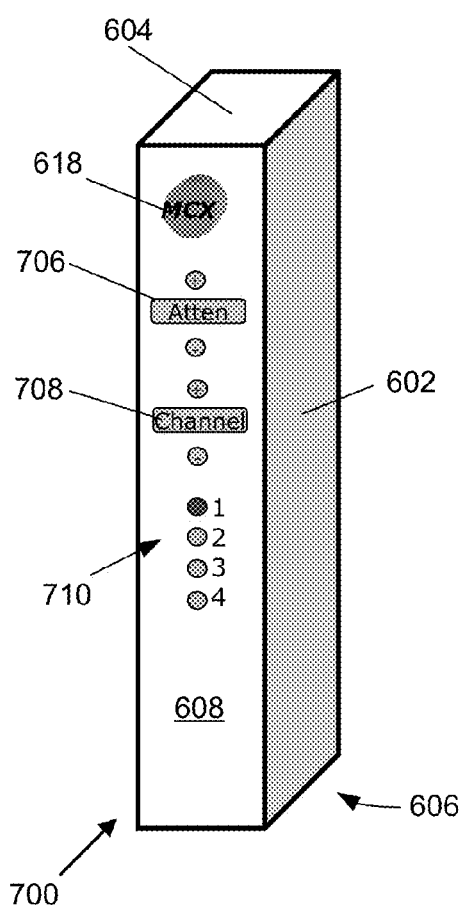
FIG. 15 is a schematic front perspective view of the radio frequency distribution module of FIG. 14.
Figure 16:
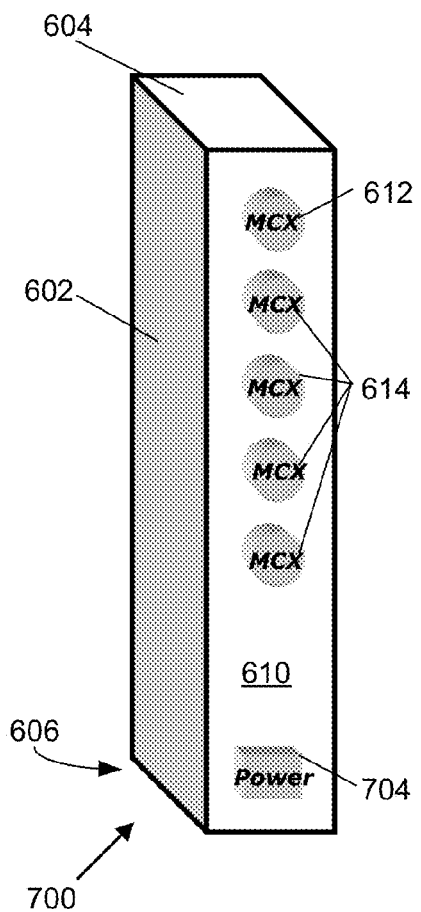
FIG. 16 is a schematic front perspective view of the radio frequency distribution module of FIG. 14.

Referring now to FIGS. 14-16, a radio frequency distribution module 700 is shown, according to a further possible embodiment of the present disclosure. In this embodiment, the radio frequency distribution module includes a variable active attenuator 702 connected to each of the output connections 614. Each variable active attenuator 702 is powered from a power connection 704 on the rear 610 of the housing 602, and provides programmable attenuation levels for each of the output connections 614. The variable active attenuators can be, in various embodiments, embodied in one or more programmable circuits configured to receive power and attenuation selection information, and to maintain that attenuation selection for a "channel". A channel, as it is used in the present disclosure, relates to a single variable active attenuator and associated output connection upon which a programmably attenuated RF signal is transmitted.

In the embodiment shown, the radio frequency distribution module 700 also includes an attenuation selector switch 706 and a channel selector switch 708 on the front 608 of the housing 602. The attenuation selector switch 706 allows a technician to activate, deactivate, or adjust the attenuation level of one of the variable active attenuators 702 connected to the output connections 614. The channel selector switch 708 allows a technician to cycle through selection of the variable active attenuators 702 to select one for adjustment using the attenuation selector switch 706.

A number of indicators 710 on the front 608 of the housing 602 display the current channel and attenuation affect of the variable active attenuator associated with that channel. In the embodiment shown, the indicators 710 correspond to light emitting diodes arranged to be activated by the associated variable active attenuator component, when that component is selected; however, other display mechanisms can be used as well.

Figure 17:
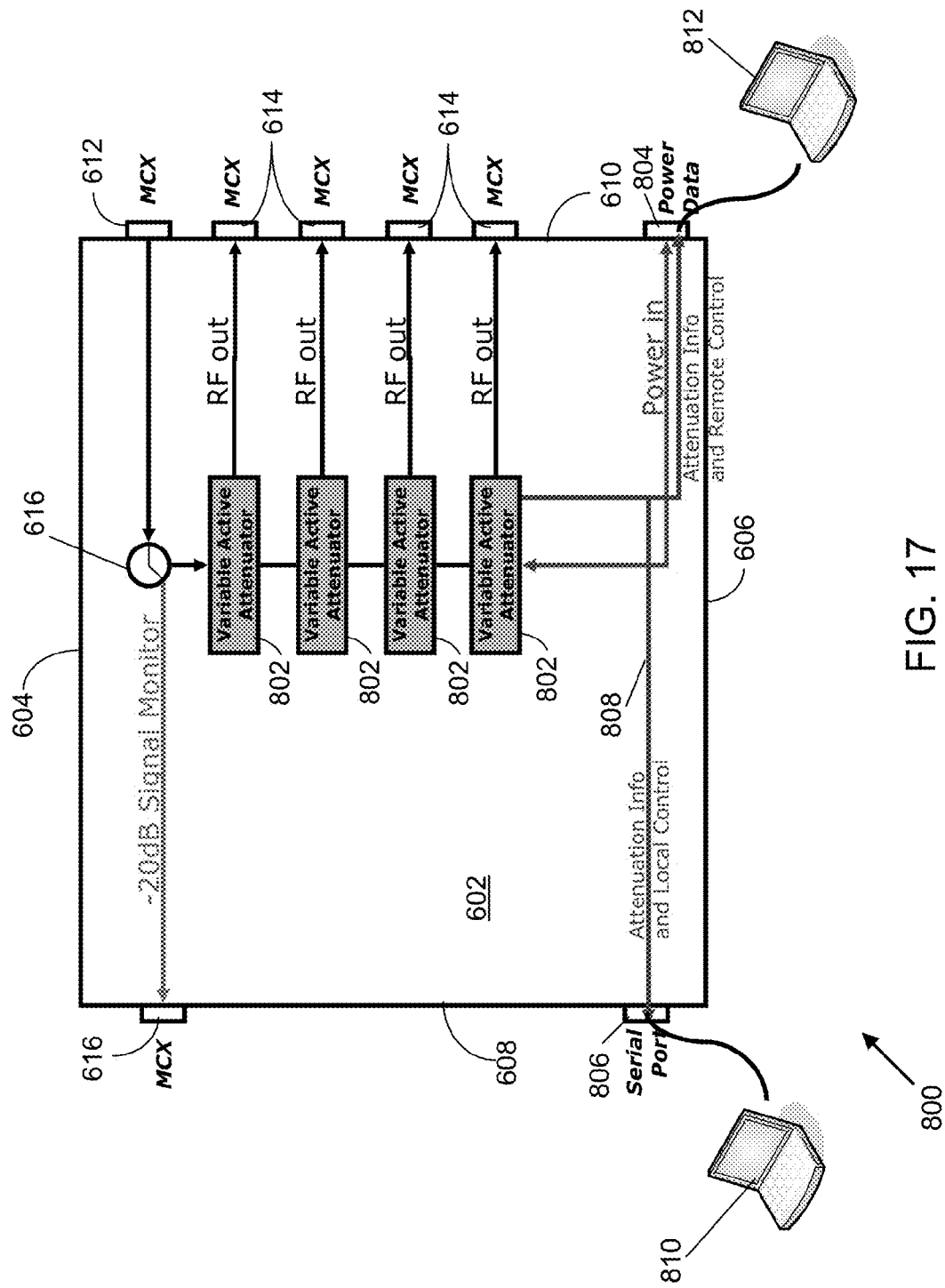
FIG. 17 is a schematic side view of a radio frequency distribution module, according to a further possible embodiment.
Figure 18:
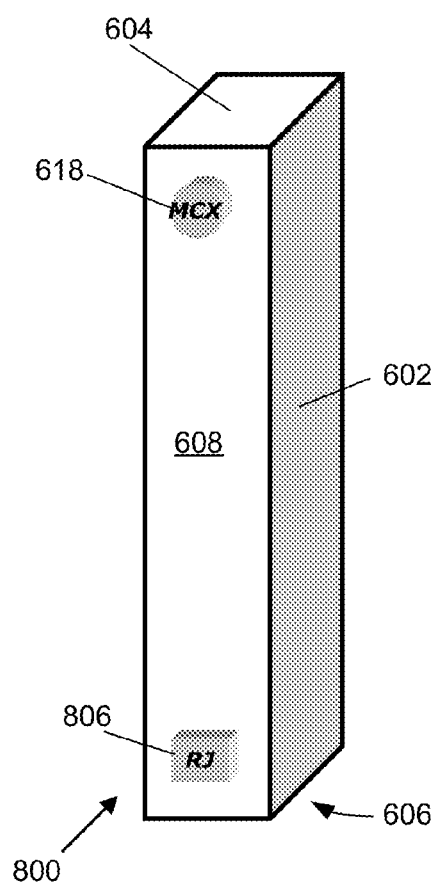
FIG. 18 is a schematic front perspective view of the radio frequency distribution module of FIG. 17.
Figure 19:
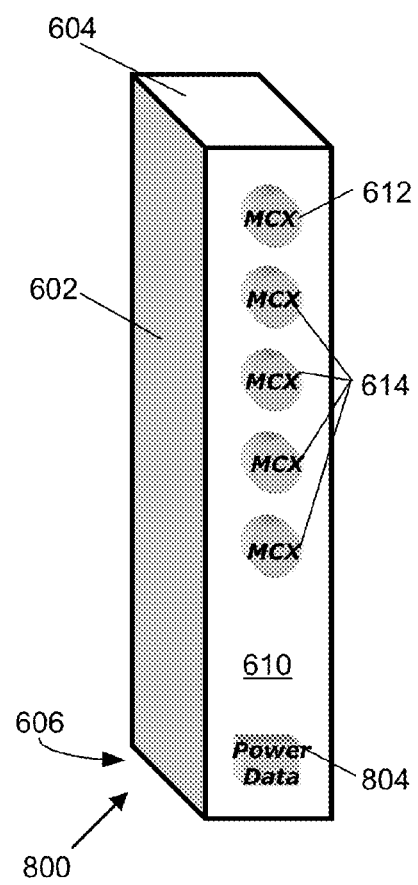
FIG. 19 is a schematic front perspective view of the radio frequency distribution module of FIG. 17.

Referring now to FIGS. 17-19, a radio frequency distribution module 800 is shown, according to a further possible embodiment of the present disclosure. The radio frequency distribution module 800 also generally incorporates the features as described in conjunction with the module 600 of FIGS. 10-12, but provides for remote or local control and monitoring of attenuation information. The radio frequency distribution module includes a variable active attenuator 802 connected to each of the output connections 614 which is controllable via a data connection. In the embodiment shown, the module 800 includes a power and data port 804 on the rear 610 of the housing 602, as well as a data port 806 on the front 608 of the housing, each of which can be used to control attenuation levels for each of the variable active attenuators 802. Each of the power and data port 804 and the data port 806 connects to an attenuation information and control signal 808 within the housing, which can be, for example, an input to a programmable circuit controlling the variable active attenuators 802 in the module 800. The power and data port 804 can be any of a number of types of socketed proprietary or standard power and data ports, such that the port can electrically connect to a complementary connection on a backplane for power and data signal routing to systems separate from the module 800. In certain embodiments, the power and data port 804 is two ports, or includes separate power and data communication connections (e.g. power pins and data pins). The data port 806 can provide local control of the module 800 by plugging a data cable (e.g. an RJ cable or other similar style serial or parallel data cable) into the port and communicating directly with a programmable circuit directing or embodying the variable active attenuators 802.

Through use of the power and data port 804 or data port 806, a module can be connected to a remote computing system (e.g. computing systems 810, 812) for controlling attenuation of each output connection 614. For example, connecting a computing system to the module 800 can allow the computing system to display a user interface for controlling attenuation (e.g. the user interface 1200 of FIG. 25, below).

Figure 20:
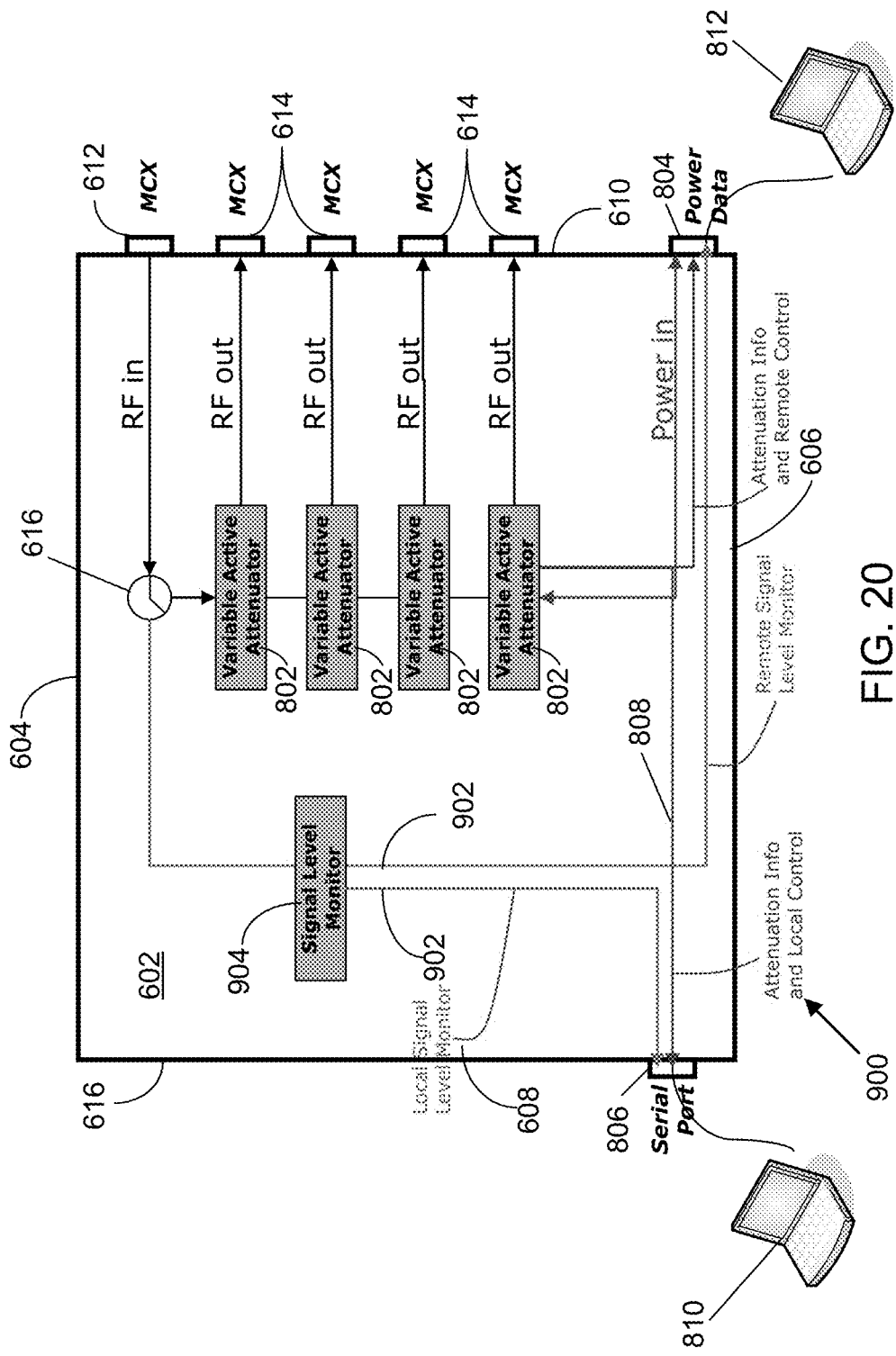
FIG. 20 is a schematic side view of a radio frequency distribution module, according to a further possible embodiment.
Figure 21:
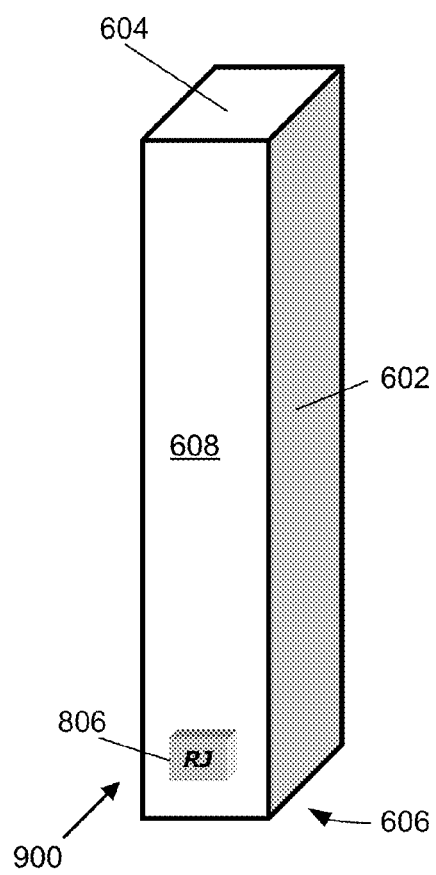
FIG. 21 is a schematic front perspective view of the radio frequency distribution module of FIG. 20.
Figure 22:
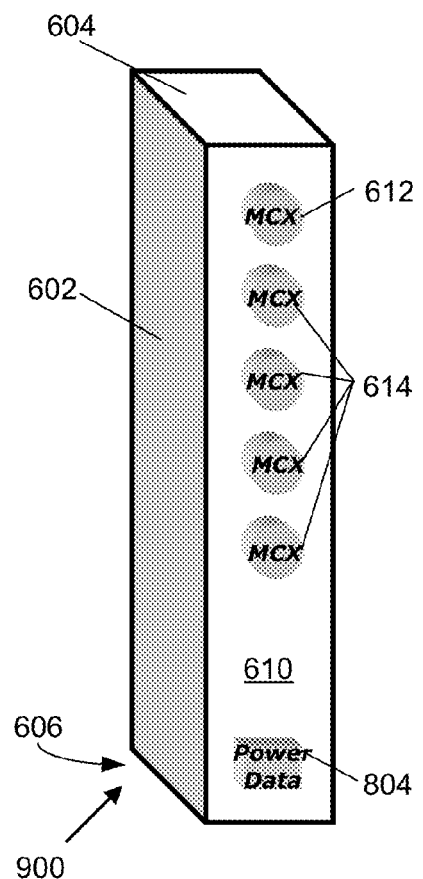
FIG. 22 is a schematic front perspective view of the radio frequency distribution module of FIG. 20.

Referring now to FIGS. 20-22, a radio frequency distribution module 900 is shown, according to another possible embodiment of the present disclosure. The radio frequency distribution module 900 generally corresponds to the module 800 of FIGS. 17-19, but also includes signal level monitor connection 902 to the power and data port 804 and the data port 806, thereby effectively replacing the monitor port 618 with a data connection. In certain embodiments (not shown), the monitor port 618 can be maintained even where the signal level monitor connection 902 is present and connected to the power and data port 804 and the data port 806.

In the embodiment shown, the signal level monitor connection 902 is generated from a signal monitor 904. The signal monitor 904 translates the RF signal received at the splitter 616 to a recognizable digital signal able to be monitored remotely via a data connection. The signal monitor 904 can accomplish this in a number of ways. In some embodiments, the signal monitor 904 measures an average differential power available on available spectra of the RF signal. In other embodiments, an integrated TV-tuner arrangement is used, in which a per-channel power is determined. In such other embodiments, a basic power-level-per-channel measurement could be made by the signal monitor 904. Alternatively, the channel signal can be digitized (e.g. through use of a digital signal processor or other A/D conversion) to analyze the power and signal content, such as modulation levels or other signal characteristics.

Although in the various embodiments of the radio frequency distribution modules herein the input and output connections and the power and data port are located on a rear side of the module, it is understood that one or more connections could be located elsewhere on the module, depending upon the desired configuration of the module within a panel. Furthermore, the data ports, switches, and indicators disclosed as located on a front of a module could alternatively be located on the rear of the module, or in an alternative location on the module as desired.

Figure 23:
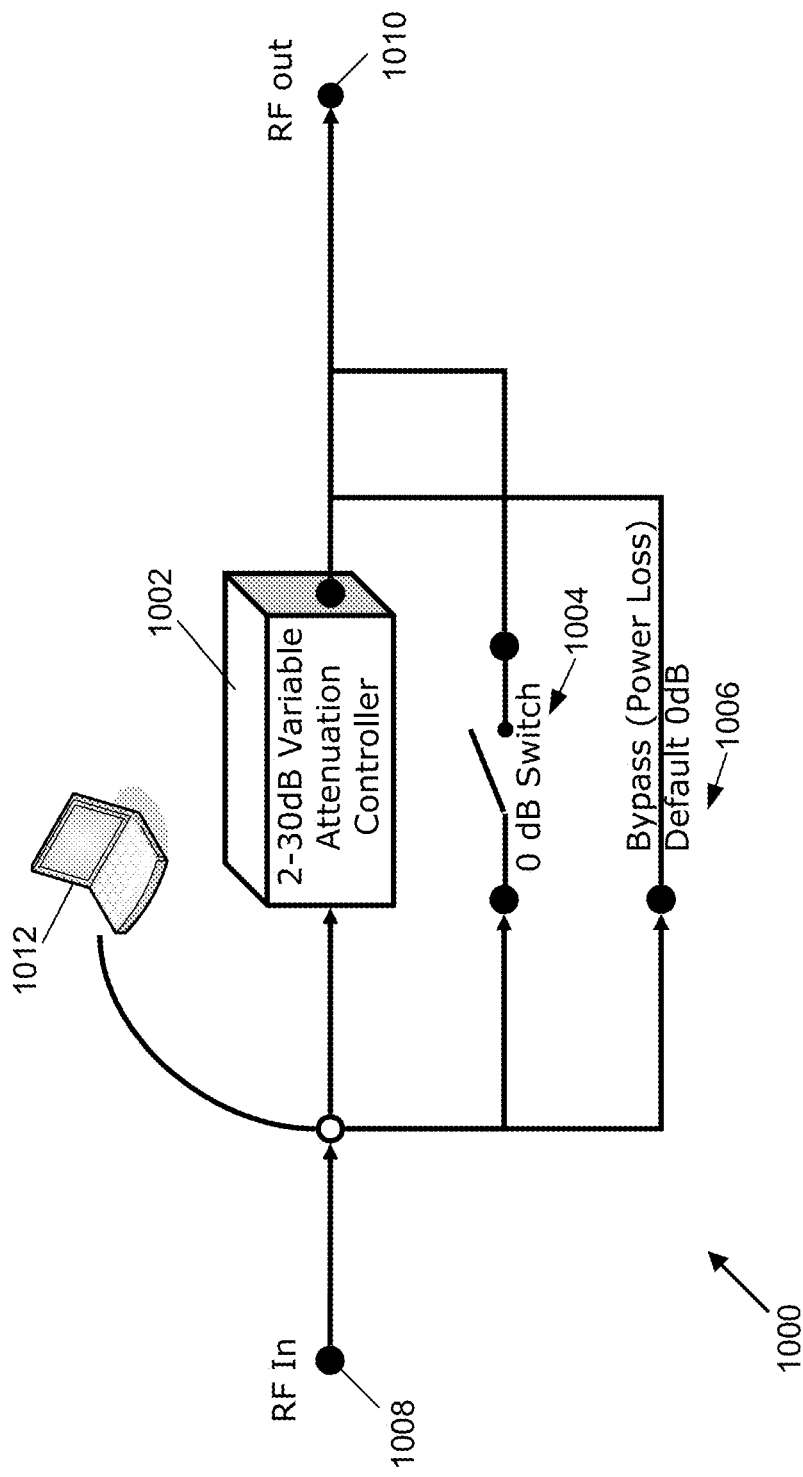
FIG. 23 is a schematic view of a circuit including an active attenuation component useable in a radio frequency distribution module, according to a possible embodiment of the present disclosure.

FIG. 23 is a schematic view of a circuit 1000 useable in a radio frequency distribution module, according to a possible embodiment of the present disclosure. The circuit 1000 can represent a portion of a variable active attenuator as illustrated in FIGS. 14, 17, and 20, above, for variable, programmable selection of an attenuation level for an output signal. In the embodiment shown, the circuit 1000 includes an active attenuation component 1002 connected in parallel with a 0 dB switch 1004 and a power loss bypass circuit 1006 between a radio frequency input connection 1008 and a radio frequency output connection 1010. The active attenuation component 1002, in the embodiment shown, provides selectable attenuation from about 2 dB to about 30 dB; however, in other embodiments, different attenuation levels could be possible through use of an attenuation component having different operational characteristics. The 0 dB switch 1004 provides a selectable conduit for passing the signal without attenuation as an alternative to passing the RF signal through the active attenuation component, which provides additional flexibility to the circuit 1000 in that the active attenuation component shown does not support 0 dB attenuation. A computing system 1012 connects to the circuit 1000 (e.g. via a data port or other connection to a radio frequency distribution module) and controls selection of attenuation levels within the circuit 1000 through a data connection to the circuit.

The power loss bypass circuit 1006 is configured to activate upon loss of power to the module in which the circuit 1000 is present, to provide continued operation of the RF circuit in the instance of a lack of power delivered to the module (e.g. in the case of a power failure at a portion of the headend or in the panel holding the module). During normal operation, the power loss bypass circuit 1006 is open, allowing selection between the active attenuation component 1002 and the 0 dB switch by the computing system 1012.

Figure 24:
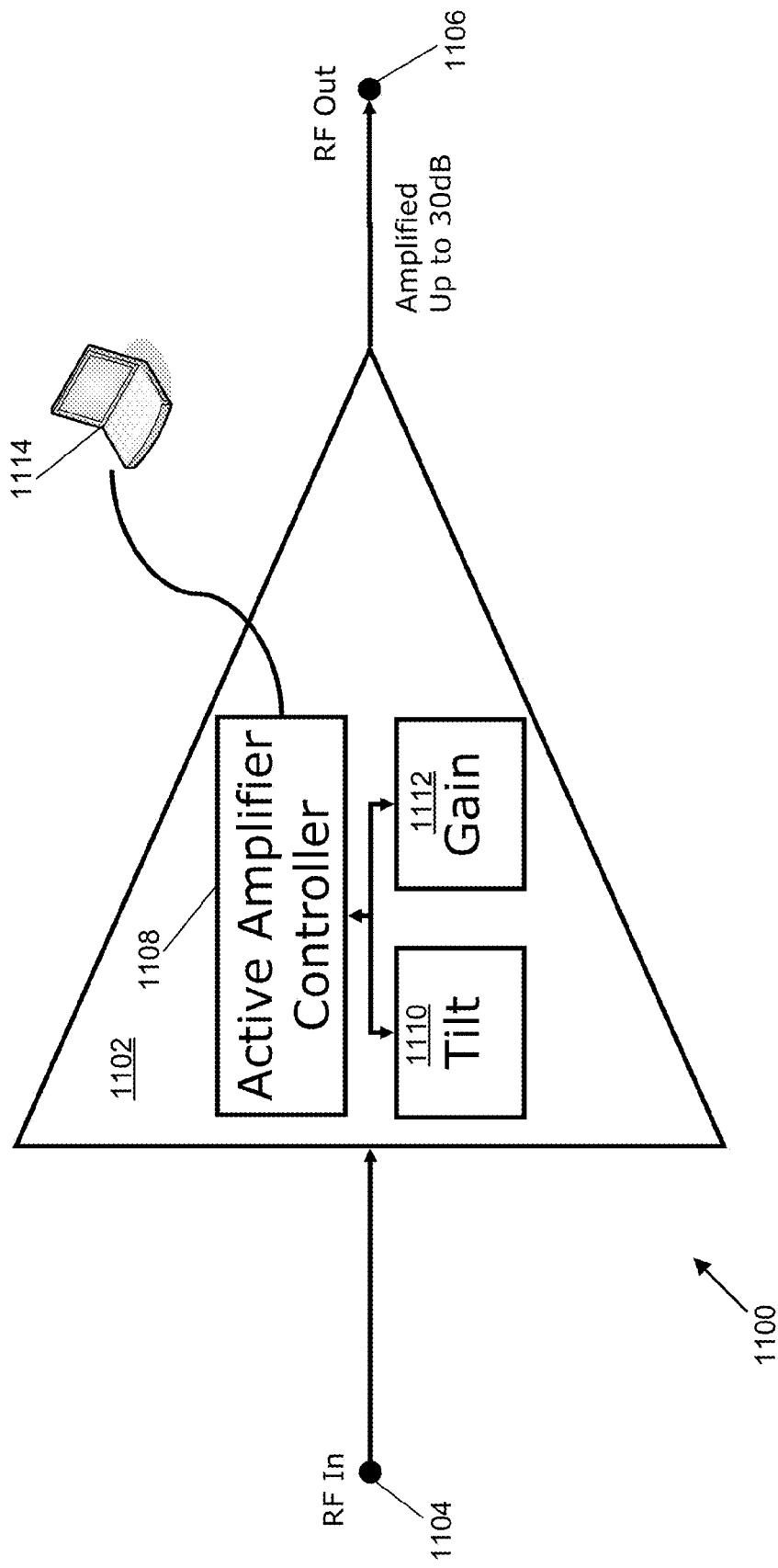
FIG. 24 is a schematic view of a circuit including an actively-controlled amplifier, according to a possible embodiment of the present disclosure.

FIG. 24 is a schematic view of a circuit 1100 including an actively-controlled amplifier, according to a possible embodiment of the present disclosure. The circuit 1100 represents a further possible functional circuit that can be included within a radio frequency distribution module according to the concepts of the present disclosure. It is understood that, although the various modules of FIGS. 7-22 are primarily discussed with respect to replacing passive attenuation components with active attenuation components, the principles described herein, and the described remote data connections, further allow a technician to remotely monitor and control traditionally active (powered) circuits, such as the amplifier circuit 1100.

The circuit 1100 includes an amplifier 1102 connected between a radio frequency input connection 1104 and a radio frequency output connection 1106. The amplifier includes an amplifier controller 1108 connected to a tilt control 1110 and a gain control 1112. The tilt and gain controls 1110, 1112 provide amplification of the input RF signal up to 30 dB, and are monitored and adjusted by the amplifier controller 1108. The amplifier controller 1108 receives monitor signals from the tilt and gain controls 1110, 1112, and outputs controls to those components to manage the output of the amplifier 1102. A computing system 1114 connects to the amplifier 1102 (e.g. via a data port or other connection to a radio frequency distribution module) and both monitors and controls the tilt and gain controls output by the amplifier controller 1108.

During a power failure, the amplifier can act as a signal pass-through circuit, providing no amplification to the RF signal passing from the radio frequency input connection 1104 to the radio frequency output connection 1106.

In certain embodiments, splitting, switching, and/or amplification can be incorporated into a single module, as desired. Further details regarding a radio frequency amplifier module including both amplification and switching are provided in U.S. Pat. No. 5,963,843, and U.S. Patent Pub. No. 2007/0195492, the disclosures of which are hereby incorporated by reference in their entireties.

Figure 25:
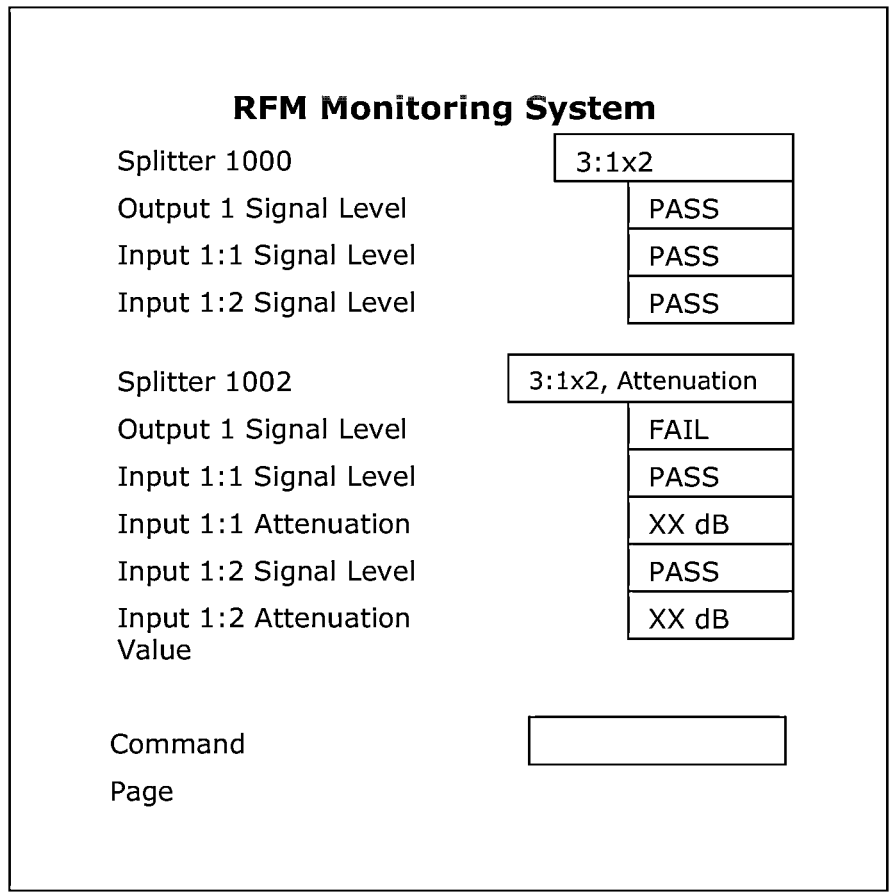
FIG. 25 is an example user interface useable for remote management of active components in a radio frequency distribution module.

FIG. 25 is an example user interface 1200 useable for remote management of active components in a radio frequency distribution module. The user interface 1200 is displayable on a display of a computing system connected to and accessing information in one or more radio frequency distribution modules, according to certain embodiments of the present disclosure. The user interface 1200 can be stored in a memory of a programmable circuit included in each radio frequency distribution module or in the computing system, and can be used by a computing system addressing or directly connected to the module. The user interface 1200 can present operational status information relating to the modules, as well as allowing a technician to adjust operational parameters of the modules.

In the embodiment shown, the user interface 1200 displays a description of the module, as well as signal continuity test results for each radio frequency input connection and radio frequency output connection relating to the modules accessible to the computing system. For example, in the embodiment shown, two modules are accessible to the computing system displaying the user interface, "Splitter 1000" and "Splitter 1002". Each of these modules are illustrated as including 3 1×2 splitters, with the "Splitter 1002" module including variable, programmable attenuation capabilities (e.g. as illustrated in FIGS. 17-22). A command region 1202 allows a technician at the computing system to adjust the attenuation of one or more variable active attenuators, reset a module, or otherwise adjust operation of one or more modules.

Although, in the embodiment shown, the user interface 1200 is configured to display information relating to a splitter/combiner and variable attenuation levels achieved within such a module, it is understood that a similar arrangement can be presented to a user for a module incorporating an amplifier or equalizer, rather than an active attenuation component. Therefore, remote management of any of a number of active components is provided.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A radio frequency signal distribution module comprising:
    a housing having a front and a rear, the housing sized to be removably inserted into a vertically-disposed slot of a radio frequency management panel having a height less than or equal to three rack units;
    a radio frequency signal input connection positioned on the rear of the housing;
    a plurality of radio frequency signal output connections positioned on the rear of the housing;
    a splitter within the housing and connecting the radio frequency signal input connection to the plurality of radio frequency signal output connections; and
    an active attenuation component connected to and providing programmable attenuation of a radio frequency signal output connection from among the plurality of radio frequency signal output connections.

2. The radio frequency signal distribution module of claim 1, further comprising a power input connection on the rear of the housing and configured to provide power to the active attenuation component.

3. The radio frequency signal distribution module of claim 1, further comprising a plurality of active attenuation components connected to each of the plurality of radio frequency signal output connections.

4. The radio frequency signal distribution module of claim 1, further comprising a data port on the front of the housing, the data port configured to communicate attenuation information to a computing system remote from the module.

5. The radio frequency signal distribution module of claim 4, further comprising a channel selector on the front of the housing, the channel selector arranged to select one of the plurality of radio frequency signal output connections for monitoring using the data port.

6. The radio frequency signal distribution module of claim 5, further comprising an attenuation selector on the front of the housing, the attenuation selector arranged to select one of a plurality of predefined attenuation levels provided by an active attenuation component associated with one of the plurality of radio frequency signal output connections selected by the channel selector.

7. The radio frequency signal distribution module of claim 1, wherein the data port is configured to transmit a signal level monitor.

8. The radio frequency signal distribution module of claim 1, further comprising a power and data port on the rear of the housing.

9. The radio frequency signal distribution module of claim 8, wherein the power and data port is configured to transmit a signal level monitor.

10. The radio frequency signal distribution module of claim 1, further comprising a bypass circuit connected in parallel to the active attenuation component.

11. The radio frequency signal distribution module of claim 10, wherein the bypass circuit provides about 0 dB attenuation.

12. The radio frequency signal distribution module of claim 1, wherein the active attenuation component includes a programmable circuit capable of generating a user interface allowing user monitoring of the module.

13. The radio frequency signal distribution module of claim 1, further comprising a signal monitor port positioned on the front of the housing and electrically connected to the radio frequency signal input connection.

14. A radio frequency signal distribution panel comprising:
    a housing comprising a top, bottom, left side, right side, front side, and rear side, the housing having a height less than or equal to three rack units;
    a plurality of vertically-disposed slots in the front side of the housing, each of the plurality of slots arranged to receive a radio frequency signal distribution module; and
    at least one radio frequency signal distribution module removably inserted into a slot from among the plurality of slots, the radio frequency signal distribution module including a data port configured to communicate attenuation information to a computing system remote from the module.

15. The radio frequency signal management panel of claim 14, further comprising a backplane arranged to distribute power signals to each radio frequency signal distribution module inserted into a slot from among the plurality of slots.

16. The radio frequency signal management panel of claim 15, wherein the backplane is further configured to route data signals among the modules inserted into the slots, thereby allowing control of a first radio frequency signal distribution module using a data port of a second radio frequency signal distribution module.

17. The radio frequency signal management panel of claim 14, wherein the active module in a radio frequency distribution module inserted into one of the plurality of slots includes an active attenuator.

18. The radio frequency signal management panel of claim 14, wherein the active module in a radio frequency distribution module inserted into one of the plurality of slots includes a radio frequency signal amplifier.

19. The radio frequency signal management panel of claim 14, wherein the housing is approximately 3 rack units in height.

20. The radio frequency signal management panel of claim 14, wherein the housing is approximately 2.5 rack units in height.

21. A radio frequency signal distribution module comprising:
    a housing having a front and a rear, the housing sized to be removably inserted into a vertically-disposed slot of a radio frequency management panel having a height less than or equal to three rack units;
    a radio frequency signal input connection positioned on the rear of the housing;
    a plurality of radio frequency signal output connections positioned on the rear of the housing;
    a splitter within the housing and connecting the radio frequency signal input connection to the plurality of radio frequency signal output connections;
    an active component connected to and providing programmable signal conditioning of a radio frequency signal output connection from among the plurality of radio frequency signal output connections; and a data port on the housing, the data port configured to communicate information about radio frequency signals within the module to a computing system remote from the module.

22. The radio frequency signal distribution module of claim 21, further comprising a signal monitor port positioned on the front of the housing and electrically connected to the radio frequency signal input connection.

23. The radio frequency signal distribution module of claim 21, further comprising a power input connection on the rear of the housing and configured to provide power to the active component.

24. The radio frequency signal distribution module of claim 21, wherein the active component includes an active attenuator.

25. The radio frequency signal distribution module of claim 21, wherein the active component includes a radio frequency signal amplifier.

26. A method of managing distribution of radio frequency signals, the method comprising:
  removably mounting a radio frequency distribution module in a vertically-disposed slot of a radio frequency signal distribution panel having a plurality of slots and having a height less than or equal to three rack units, the radio frequency distribution module including a radio frequency input connection, a plurality of radio frequency output connections, and at least one active radio frequency component;
  connecting a computing system to a data connection of the radio frequency distribution module; and
  monitoring a signal using the computing system.

27. The method of claim 26, further comprising programming the active radio frequency component using the computing system to modify the signal at one or more of the plurality of radio frequency output connections.

28. The method of claim 26, wherein monitoring comprises viewing a user interface of the computing system at a location remote from the radio frequency signal distribution panel.

29. The method of claim 26, wherein the active radio frequency component is selected from the group consisting of:
  a signal attenuator; and
  an amplifier.

* * * * *